(12) United States Patent
Kim

(10) Patent No.: US 12,422,778 B2
(45) Date of Patent: Sep. 23, 2025

(54) OPTICAL SCANNING HOLOGRAPHY SYSTEM

(71) Applicant: CUBIXEL CO., LTD., Seoul (KR)

(72) Inventor: Tae Geun Kim, Seoul (KR)

(73) Assignee: CUBIXEL CO., LTD, Seoul (KR)

( * ) Notice: Subject to any disclaimer, the term of this patent is extended or adjusted under 35 U.S.C. 154(b) by 0 days.

(21) Appl. No.: 18/217,626

(22) Filed: Jul. 3, 2023

(65) Prior Publication Data

US 2023/0341814 A1     Oct. 26, 2023

Related U.S. Application Data

(62) Division of application No. 17/272,669, filed as application No. PCT/KR2019/010807 on Aug. 23, 2019, now Pat. No. 11,977,353.

(30) Foreign Application Priority Data

Sep. 3, 2018   (KR) .................. 10-2018-0104634
Nov. 8, 2018   (KR) .................. 10-2018-0136475
Mar. 28, 2019  (KR) .................. 10-2019-0035836

(51) Int. Cl.
*G03H 1/22*       (2006.01)
*G02B 26/10*      (2006.01)
(Continued)

(52) U.S. Cl.
CPC .......... *G03H 1/0443* (2013.01); *G02B 26/101* (2013.01); *G02B 27/283* (2013.01); *G02B 27/286* (2013.01); *G03H 2001/0447* (2013.01); *G03H 2001/0463* (2013.01); *G03H 2222/31* (2013.01); *G03H 2222/45* (2013.01); *G03H 2223/20* (2013.01); *G03H 2223/22* (2013.01);
(Continued)

(58) Field of Classification Search
CPC ... G03H 2001/0447; G03H 2001/0463; G03H 2222/31; G03H 2222/45; G03H 2223/20; G03H 2223/22; G02B 26/101; G02B 27/283; G02B 27/286
USPC ................................. 359/1, 32, 33; 356/487
See application file for complete search history.

(56) References Cited

U.S. PATENT DOCUMENTS 5,064,257 A  *  11/1991  Shinoda ................... G03H 1/00
                                                                    359/10
5,412,500 A      5/1995  Fergason
(Continued)

OTHER PUBLICATIONS

Non-Final Office Action of U.S. Appl. No. 18/217,618 mailed Feb. 14, 2024.

*Primary Examiner* — Audrey Y Chang
(74) *Attorney, Agent, or Firm* — Revolution IP, PLLC

(57) ABSTRACT

An optical scanning holography system includes a polarization-sensitive lens configured to receive a linearly polarized beam and generate a first spherical wave of right-handed circular polarized light having a negative focal length and a second spherical wave of left-handed circular polarized light having a positive focal length, a first polarizer configured to pass only a beam component therethrough in a predetermined polarization direction among components of the generated first and second spherical waves, a scanning unit configured to scan an object by using an interference beam generated between the first and second spherical waves passing through the first polarizer, and a first photodetector configured to detect a beam reflected from the object.

4 Claims, 19 Drawing Sheets

(51) Int. Cl.
*G02B 27/28* (2006.01)
*G03H 1/04* (2006.01)
(52) U.S. Cl.
CPC ..... *G03H 2223/24* (2013.01); *G03H 2225/32* (2013.01); *G03H 2226/02* (2013.01)

(56) References Cited

U.S. PATENT DOCUMENTS

| | | | |
|---|---|---|---|
| 5,805,316 | A | 9/1998 | Shinoda et al. |
| 10,197,810 | B2 * | 2/2019 | Seo ................ G02B 27/286 |
| 2004/0119982 | A1 * | 6/2004 | Matsumoto ........ A61B 5/14558 |
| | | | 356/487 |
| 2004/0190094 | A1 | 9/2004 | Kawano et al. |
| 2006/0028962 | A1 * | 2/2006 | Zachar ............... G11B 7/24088 |
| | | | 369/112.01 |
| 2016/0011353 | A1 * | 1/2016 | Escuti ..................... G02B 5/32 |
| | | | 359/15 |
| 2016/0357146 | A1 | 12/2016 | Brooker et al. |
| 2019/0346811 | A1 * | 11/2019 | Min ....................... G03H 1/041 |

* cited by examiner

OPTICAL SCANNING HOLOGRAPHY SYSTEM

CROSS-REFERENCE TO RELATED APPLICATION

This application is a Division of U.S. patent application Ser. No. 17/272,669 filed on Mar. 2, 2021, which is the 35 U.S.C. 371 national stage of international application PCT/KR2019/010807 filed on Aug. 23, 2019, which claims priority to Korean Patent Application Nos. 10-2018-0104634 filed on Sep. 3, 2018, 10-2018-0136475 filed on Nov. 8, 2018, and 10-2019-0035836 filed on Mar. 28, 2019. The entire contents of each of the above-identified applications are hereby incorporated by reference.

BACKGROUND OF THE INVENTION

The present disclosure relates to an optical scanning holography system, and more particularly, to an optical scanning holography system capable of implementing a high-efficiency and high-quality optical scanning holography.

An optical scanning-based object hologram acquisition device of the related art formed a scanning beam pattern by using an interferometric structure that spatially splits coherent light (interferable light) into a first beam and a second beam and then temporally and spatially performs an optical modulation of the first and second beams traveling along each individual optical path on separate optical paths and recombines the beams again.

However, in the related art, a difference between separated two optical paths has to be shorter than a coherence length of coherence light in order to form a scan pattern, and thus, a high coherence light source is required, and a mechanism with high precision and stability of wavelength unit of light is required.

In addition, a bulky optical system for separating and recombining light is required, and also a complicated electro-optical structure for modulating each of the first and second beams in time and space is required. Moreover, there is a problem in that the electro-optical system having such a complex structure is very vulnerable to external environmental factors such as vibration is unstable.

In addition, according to an optical scanning method of the related art, in order to obtain a hologram of an actual object without bi-image noise and background noise, an additional and complicated modulator is required, such as an acoustic optical modulator or an electro-optical modulator that modulate a phase of light according to an electric signal generated by a function generator.

However, the acoustic optical modulator is bulky and requires a high-frequency signal generating device in the MHz band and requires high-energy sound wave generation, and thus, power loss is large. In addition, the electro-optical modulator is not only bulky but also requires a voltage amplifier for generating a high voltage and has a high complexity of the device.

These problems act as the biggest obstacle in practical use of the existing optical scanning hologram.

PRIOR ART DOCUMENT

[Patent Document]
Korean Patent Publication No. 2013-0081127 (published date 2013 Jul. 16).

SUMMARY OF THE INVENTION

An object of the present disclosure is to provide an optical scanning holography system capable of implementing a high-efficiency and high-quality optical scanning holography.

According to an embodiment of the present disclosure, an in-line scanning holography system includes a polarization-sensitive lens that receives a linearly polarized beam and generates a first spherical wave of right-handed circular polarized light having a negative focal length and a second spherical wave of left-handed circular polarized light having a positive focal length, a first polarizer that passes only a beam component therethrough in a predetermined polarization direction among components of the generated first and second spherical waves, a scanning unit that scans an object by using an interference beam generated between the first and second spherical waves passing through the first polarizer, and a first photodetector that detects a beam reflected from the object.

In addition, the in-line scanning holography system may further include a linear polarization direction converter that is located at a front stage of the polarization-sensitive lens and changes a polarization direction by retarding a phase of a linearly polarized beam incident from the outside to providing the linearly polarized beam to the polarization-sensitive lens.

In addition, the polarization-sensitive lens may be configured with a geometric phase lens.

In addition, the in-line scanning holography system may further include a signal generator that applies a phase modulation signal for varying a phase retardation value with time to the linear polarization direction converter.

In addition, the phase modulation signal may be a periodic ramp signal in which the phase retardation value linearly varies with time, and the interference beam may have a form of a heterodyne-modulated nonlinear Fresnel zone plate with time and may be defined by a following equation.

$$I_{fzp}(x_0, y_o; z) = \cos\left[\frac{2\pi f_{gp}}{\lambda(2f_{gp}+z)z}(x_0^2 + y_0^2) + 2\Omega_0 t\right]$$

Here, $\lambda$ is a wavelength of a used beam, $f_{gp}$ is a focal length of the polarization-sensitive lens, $(x_0^2+y_0^2)$ is a Catharsian coordinate system having a plane orthogonal to an optical axis of the linearly polarized beam as $(x_0, y_0)$, and z is a distance from a focal point of the second spherical wave to the object, and a periodic ramp signal according to a time t may have a slope of $\Omega_0$ and is represented as a function of $\Omega(t)=\Omega_0 t$ having a value between 0 and $\pi$.

In addition, the phase modulation signal may be a phase shift signal in which the phase retardation value is discontinuously shifted in an order of 0, $\pi/2$, and $\pi$ with time, and the interference beam may have a form of a heterodyne-modulated nonlinear Fresnel zone plate with time and is defined by a following equation.

$$I(x_0, y_o; z) = \cos\left[\frac{2\pi f_{gp}}{\lambda(2f_{gp}+z)z}(x_0^2 + y_0^2) + p_n\right]$$

Here, $\lambda$ is a wavelength of a used beam, $f_{gp}$ is a focal length of the polarization-sensitive lens, $(x_0^2+y_0^2)$ is a Catharsian coordinate system having a plane orthogonal to an optical axis of the linearly polarized beam as $(x_0, y_0)$, z is a distance from a focal point of the second spherical wave to the object, and $P_n$ is a set of n different phase 0, π/2, and π used for phase shifting.

According to another embodiment of the present disclosure, a geometric phase scanning holography system includes a first beam splitter that forms an interference beam by overlapping a plane wave of left-handed circular polarized light and a spherical wave of right-handed circular polarized light, a scanning unit that scans an object by using the interference beam, a second beam splitter that receives a beam reflected from the object and splits the received beam into a first output beam and a second output beam, a first polarizer and a second polarizer that polarize the first output beam and the second output beam respectively, and a first photodetector and a second photodetector that detect the first output beam and the second output beam passing through the first polarizer and the second polarizer respectively.

In addition, the present disclosure provides a geometric phase scanning holography system including a first beam splitter that forms an interference beam by overlapping a plane wave of left-handed circular polarized light and a spherical wave of right-handed circular polarized light, a scanning unit that scans an object by using the interference beam, a second beam splitter that receives a beam reflected from the object and splits the received beam into a first output beam and a second output beam, a third beam splitter that splits the first output beam into $1a^{th}$ and $1b^{th}$ output beams, a fourth beam splitter that splits the second output beam into $2a^{th}$ and $2b^{th}$ output beams, first and second polarizers that polarize the $1a^{th}$ and $1b^{th}$ output beams respectively, third and fourth polarizers that polarize the $2a^{th}$ and $2b^{th}$ output beams respectively, and first to fourth photodetectors that detect each output beam passing through the first to fourth polarizers.

In addition, the present disclosure provides a geometric phase scanning holography system including a first beam splitter that forms an interference beam by overlapping a plane wave of left-handed circular polarized light and a spherical wave of right-handed circular polarized light, a scanning unit that scans an object by using the interference beam, a second beam splitter that receives a beam reflected from the object and splits the received beam into a first output beam and a second output beam, a third beam splitter that splits the first output beam into $1a^{th}$ and $1b^{th}$ output beams, first and second polarizers that polarize the $1a^{th}$ and $1b^{th}$ output beams respectively, a third polarizer that polarizes the second output beam, and first to third photodetectors that detect each output beam passing through the first to third polarizers.

Here, the geometric phase scanning holography system may further include a polarization beam splitter that splits an incident linearly polarized beam into a p-polarized first beam and a s-polarized second beam that are orthogonal to each other, a first quarter wave plate that converts the first beam into a left-handed circular polarized beam, a second quarter wave plate that converts the second beam into a right-handed circular polarized beam, a first collimator that expands the left-handed circular polarized beam and provides a plane wave of left-handed circular polarized light to the first beam splitter, a second collimator that expands the right-handed circular polarized beam and provides a plane wave of right-handed circular polarized light, and a first lens that converts the plane wave of right-handed circular polarized light into a spherical wave and provides the spherical wave to the first beam splitter.

In addition, the interference beam may have a form of a geometric phase Fresnel zone plate and is defined by a following equation.

$$I_{GP-FZP}(x_0, y_0; z) = \cos\left[\frac{\pi}{\lambda z}(x_0^2 + y_0^2) + 2\theta\right]$$

Here, λ is a wavelength of a used beam, ($x_0^2+y_0^2$) is a Catharsian coordinate system having a plane orthogonal to an optical axis of beam as ($x_0,y_0$), z is a distance from a focal point of the spherical wave to the object, and θ is an angle linearly polarized clockwise with respect to a p-polarization axis of the polarization beam splitter.

In addition, the geometric phase scanning holography system may further include an electronic processor that generates a complex hologram of the object by processing a first current signal and a second current signal detected by the first photodetector and the second photodetector respectively, and the first photodetector and the second photodetector may generate the first current signal $$I_0^{dc}(x, y; z)$$

and the second current signal $$I_{\pi/2}^{dc}(x, y; z)$$

respectively, as represented by following equations in correspondence with intensities of the first output beam and the second output beam passing through the first polarizer and the second polarizer, respectively.

$$I_0^{dc}(x, y; z) = \int O(x_0, y_0; z) \otimes \left\{\cos\left[\frac{\pi}{\lambda z}(x_0^2 + y_0^2)\right] + dc\right\}dz$$

$$I_{\pi/2}^{dc}(x, y; z) = \int O(x_0, y_0; z) \otimes \left\{\cos\left[\frac{\pi}{\lambda z}(x_0^2 + y_0^2) + \frac{\pi}{2}\right] + dc\right\}dz$$

Here, $O(x_0,y_0;z)$ is a three-dimensional distribution of the reflectance of the object and is a three-dimensional image of the object, ⊗ is a convolution operation, λ is a wavelength of a used beam, (x,y) is a scan position of a scan beam designated by the scanning unit, z is a distance from a focal point of the spherical wave to the object, and dc is a DC bias component.

In addition, the geometric phase in-line scanning holography system may further include an electronic processor that generates a complex hologram of the object by processing first to fourth current signals detected by the first to fourth photodetectors, and the first to fourth photodetectors may generate the first to fourth current signals as represented by a following equation in correspondence with intensities of respective output beams passing through the first to fourth polarizers.

$$I_{p_n} = (x, y; z)\int O(x_0, y_0; z) \otimes \cos\left[\frac{2\pi f_{gp}}{\lambda(2f_{gp}+z)z}(x_0^2 + y_0^2) + p_n\right]dz,$$

$$p_n = \left\{0, \frac{\pi}{2}, \pi, \frac{3\pi}{2}\right\}$$

Here, $I_{p_n}(x,y;z)$ is an $n^{th}$ current signal generated by the first to fourth photodetectors (n=1, 2, 3, and 4), $P_n$ is a shifted phase of a hologram signal generated by a photodetector designated by n, $O(x_0,y_0;z)$ is a three-dimensional distribution of reflectance of the object and is a three-dimensional image of the object, $\otimes$ is a convolution operation, $\lambda$ is a wavelength of a used beam, (x,y) is a scan position of a scan beam designated by the scanning unit, and z is a distance from a focal point of the spherical wave to the object.

In addition, the present disclosure provides a geometric phase in-line scanning holography system including a polarization-sensitive lens that receives a linearly polarized beam and generate a first spherical wave of right-handed circular polarized light having a negative focal length and a second spherical wave of left-handed circular polarized light having a positive focal length, a scanning unit that scans an object by using an interference beam generated between the generated first spherical wave and the generated second spherical wave, a first beam splitter that receives a beam reflected from the object and splits the reflected beam into a first output beam and a second output beam, a first polarizer and a second polarizer that polarize the first output beam and the second output beam, respectively, and a first photodetector and a second photodetector that detect the output beams passing through the first polarizer and the second polarizer, respectively.

In addition, the present disclosure provides a geometric phase in-line scanning holography system including a polarization-sensitive lens that receives a linearly polarized beam and generates a first spherical wave of right-handed circular polarized light having a negative focal length and a second spherical wave of left-handed circular polarized light having a positive focal length, a scanning unit that scans an object by using an interference beam generated between the generated first spherical wave and the generated second spherical wave, a first beam splitter that receives a beam reflected from the object and split the reflected beam into a first output beam and a second output beam, a second beam splitter that splits the first output beam into $1a^{th}$ and $1b^{th}$ output beams, a third beam splitter that splits the second output beam into $2a^{th}$ and $2b^{th}$ output beams, first and second polarizers that polarize the $1a^{th}$ and $1b^{th}$ output beams respectively, third and fourth polarizers that polarize the $2a^{th}$ and $2b^{th}$ output beams respectively, and first to fourth photodetectors that detect each output beam passing through the first to fourth polarizers.

In addition, the present disclosure provides a geometric phase in-line scanning holography system including a polarization-sensitive lens that receives a linearly polarized beam and generates a first spherical wave of right-handed circular polarized light having a negative focal length and a second spherical wave of left-handed circular polarized light having a positive focal length, a scanning unit that scans an object by using an interference beam generated between the generated first spherical wave and the generated second spherical wave, a first beam splitter that receives a beam reflected from the object and split the reflected beam into a first output beam and a second output beam, a second beam splitter that splits the first output beam into $1a^{th}$ and $1b^{th}$ output beams, first and second polarizers that polarize the $1a^{th}$ and $1b^{th}$ output beams respectively, a third polarizer that polarizes the second output beam, and first to third photodetectors that detect each output beam passing through the first to third polarizers.

In addition, the polarization-sensitive lens may be configured with a geometric phase lens.

In addition, the interference beam may have a form of a geometric phase Fresnel zone plate and is defined by a following equation.

$$I_{GP-FZP}(x_\theta, y_0; z) = \cos\left[\frac{2\pi f_{gp}}{\lambda(2f_{gp}+z)z}(x_0^2 + y_0^2) + 2\theta\right]$$

Here, $\lambda$ is a wavelength of a used beam, $f_{gp}$ is a focal length of the polarization-sensitive lens, $(x_0^2+y_0^2)$ is a Catharsian coordinate system having a plane orthogonal to an optical axis of the linearly polarized beam as $(x_0,y_0)$, z is a distance from a focal point of the second spherical wave to the object, and $\theta$ is an angle linearly polarized clockwise with respect to a polarization axis of a light source side polarizer that generates and provides the linearly polarized beam from a light source.

In addition, the geometric phase in-line scanning holography system may further include an electronic processor that generates a complex hologram of the object by processing a first current signal and a second current signal detected by the first photodetector and the second photodetector respectively, and the first photodetector and the second photodetector may generate the first current signal $$I_0^{dc}(x, y; z)$$

and the second current signal $$I_{\pi/2}^{dc}(x, y; z)$$

respectively, as represented by following equations in correspondence with intensities of the first output beam and the second output beam passing through the first polarizer and the second polarizer respectively.

$$I_0^{dc}(x, y) = \int O(x_0, y_\theta; z) \otimes \left\{\cos\left[\frac{2\pi f_{gp}}{\lambda(2f_{gp}+z)z}(x_0^2 + y_0^2)\right] + dc\right\}dz$$

$$I_{\pi/2}^{dc}(x, y) = \int O(x_0, y_0; z) \otimes \left\{\cos\left[\frac{2\pi f_{gp}}{\lambda(2f_{gp}+z)z} + \frac{\pi}{2}\right] + dc\right\}dz$$

Here, $O(x_0,y_0;z)$ is a three-dimensional distribution of the reflectance of the object and is a three-dimensional image of the object, $\otimes$ is a convolution operation, k is a wavelength of a used beam, (x,y) is a scan position of a scan beam designated by the scanning unit, $f_{gp}$ is a focal length of the polarization-sensitive lens, z is a distance from a focal point of the second spherical wave to the object, and dc is a DC bias component.

In addition, the geometric phase in-line scanning holography system may further include an electronic processor that generates a complex hologram of the object by processing first to fourth current signals detected by the first to fourth photodetectors, and the first to fourth photodetectors may generate the first to fourth current signals as represented by a following equation in correspondence with intensities of respective output beams passing through the first to fourth polarizers.

$$I_{p_n}(x, y; z) = \int O(x_0, y_0; z) \otimes \cos\left[\frac{2\pi f_{gp}}{\lambda(2f_{gp}+z)z}(x_0^2 + y_0^2) + p_n\right]dz,$$

-continued $$p_n = \left\{0, \frac{\pi}{2}, \pi, \frac{3\pi}{2}\right\}$$

Here, $I_{p_n}(x,y;z)$ is an $n^{th}$ current signal generated by the first to fourth photodetectors (n=1, 2, 3, and 4), $P_n$ is a shifted phase of a hologram signal generated by a photodetector designated by n, $O(x_0,y_0;z)$ is a three-dimensional distribution of reflectance of the object and is a three-dimensional image of the object, $\otimes$ is a convolution operation, k is a wavelength of a used beam, (x,y) is a scan position of a scan beam designated by the scanning unit, $f_{gp}$ is a focal length of the polarization-sensitive lens, and z is a distance from a focal point of the second spherical wave to the object.

According to an in-line scanning holography system of the present disclosure, a high-efficiency and high-quality optical scanning holography may be implemented by forming a scan pattern in a single optical path by using a polarization-sensitive lens and also there is an advantage in that the optical scanning holography is resistant to external environment by using a high-stability and low-complexity optical system structure.

In addition, according to a geometric phase scanning holography system of the present disclosure, a complex hologram of a real object without bi-image noise and background noise may be obtained by using a geometric structure according to polarization without using a complicated modulator for modulating an optical signal, and thus, the geometric phase scanning holography system has a reduced complexity of a structure and may be miniaturized and lightened and may also be applied to mobile devices sensitive to energy consumption.

In addition, according to a geometric phase in-line scanning holography system according to the present disclosure, the geometric phase in-line scanning holography system has high stability and low complexity by forming a scan pattern in a single optical path by using a polarization-sensitive lens, and a complex hologram of a real object without bi-image noise and background noise may be obtained by using a geometric structure according to polarization even without using a complicated modulator, and thus, a high-efficiency and high-quality optical scanning holography may be implemented.

DETAILED DESCRIPTION

Hereinafter, embodiments of the present disclosure will be described in detail with reference to the accompanying drawings such that those skilled in the art to which the present disclosure belongs may easily implement the present disclosure.

The present disclosure is largely classified into three types as an optical scanning holography system for realizing a high-efficiency and high-quality optical scanning holography.

The first is an in-line scanning holography system, the second is a geometric phase scanning holography system, and the third is a geometric phase in-line scanning holography system configured by combining the two systems.

First, an in-line scanning holography system will be described.

The in-line scanning holography system forms a scan pattern in a single optical path by using a polarization-sensitive lens, thereby realizing high-efficiency and high-quality optical scanning holography having a high stability and low complexity optical system structure.

Figure 1:
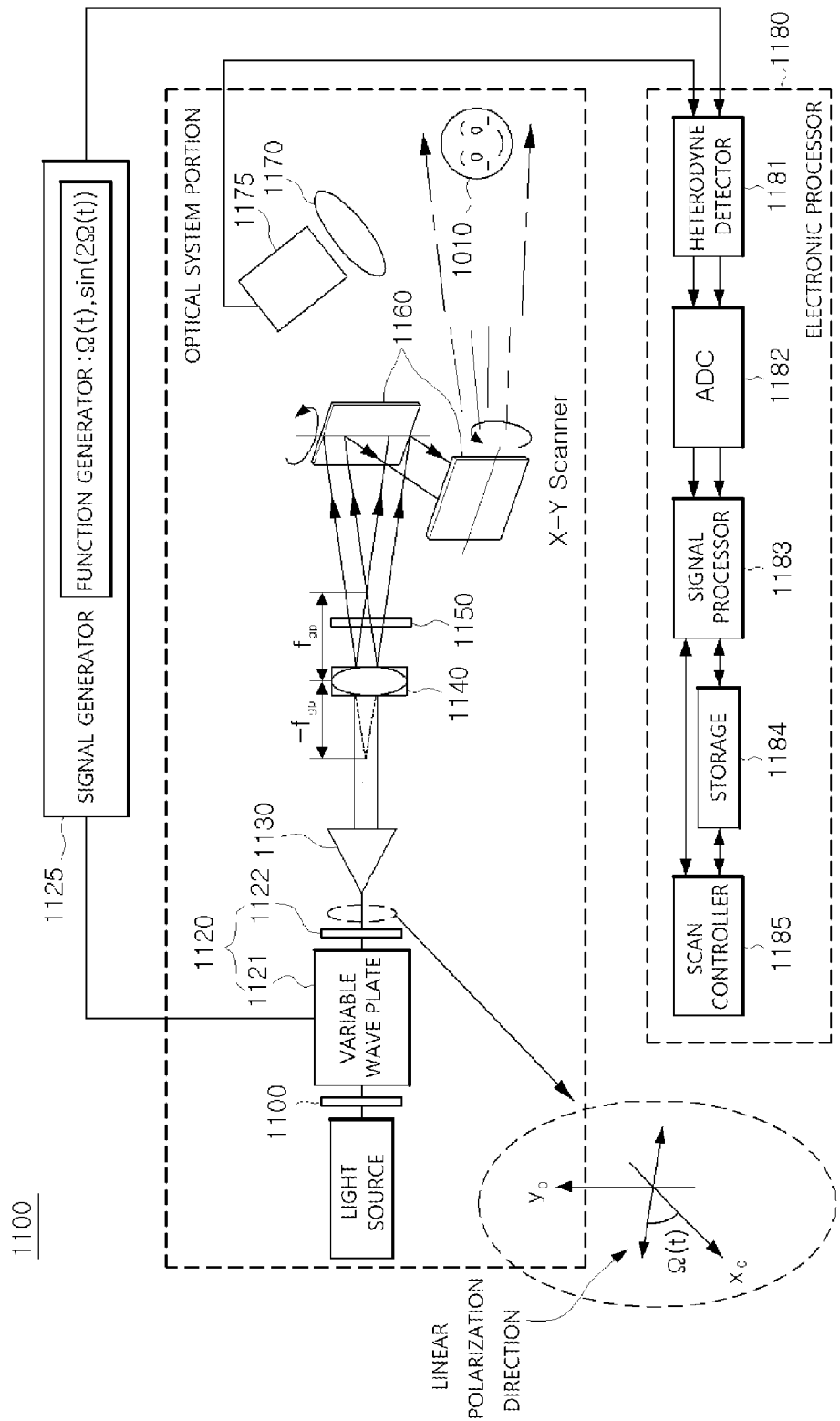
FIG. 1 is a diagram illustrating a first embodiment of an in-line scanning holography system according to the present disclosure.

FIG. 1 is a diagram illustrating a first embodiment of an in-line scanning holography system according to the present disclosure.

As illustrated in FIG. 1, an in-line scanning holography system 1100 according to the first embodiment includes a polarizer 1110, a linear polarization direction converter 1120, a signal generator 1125, a collimator 1130, a polarization-sensitive lens 1140, a polarizer 1150, scanning unit 1160, a light integrator 1170, a first photodetector 1175, and an electronic processor 1180.

First, a light source generates electromagnetic waves. In an embodiment of the present disclosure, the light source may include various devices such as a laser generator that outputs coherent light, a light emitting diode (LED) lamp with low coherence, and a halogen lamp having a short coherence length.

The polarizer (linear polarizer) 1110 converts an inputted beam into a linearly polarized beam and provides the linearly polarized beam to the linear polarization direction converter 1120. In FIG. 1, the light source and the polarizer 1110 may be omitted, and in this case, an externally generated linearly polarized beam may be directly inputted to the linear polarization direction converter 1120. In addition, when the light source is omitted in FIG. 1, a light source provided from the outside may be directly inputted to the polarizer 1110.

The linear polarization direction converter 1120 changes a polarization direction by retarding a phase of the linearly polarized beam incident from the polarizer 1110 and outputs the linearly polarized beam to the polarization-sensitive lens 1140.

The linear polarization direction converter 1120 may vary phase retardation of the linearly polarized beam according to time based on a phase modulation signal applied by the signal generator 1125. The phase modulation signal is a signal for varying a phase retardation value according to a time t and is generated by a function generator of the signal generator 1125 and represented as a function of $\Omega(t)$.

In an embodiment of the present disclosure, the linear polarization direction converter 1120 may include a variable wave plate 1121 and a quarter wave plate 1122. Each of the wave plates is an optical element that changes a polarization state of light and is called a phase retarder.

The variable wave plate 1121 varies polarization according to time by phase-retarding an incident linearly polarized beam according to a phase modulation signal of the signal generator 1125. In addition, the quarter wave plate 1122 changes the polarization of the beam passing through the variable wave plate 1121. The quarter wave plate 1122 phase-retards the incident beam by $\lambda/4$ and transfers a linearly polarized beam whose polarization direction is rotated to the collimator 1130.

In this way, the variable wave plate 1121 changes the polarization of the linearly polarized beam received from the polarizer 1110 according to a signal of the function generator and transfers the linearly polarized beam to the quarter wave plate 1122, and the quarter wave plate 1122 outputs the linearly polarized beam whose polarization direction is rotated. Here, the function generator may retard a phase of the variable wave plate 1121 such that the direction of the beam output from the quarter wave plate 1122 varies with time with respect to an $x_0$ axis to $\Omega(t)$.

In an embodiment of the present disclosure, the variable wave plate 1121 may be configured by a Pockels cell using an electric-optic effect that induces a phase retardation of a beam according to an electrical signal, a liquid crystal variable waveplate that varies the phase retardation of the beam by changing a direction of a liquid crystal director according to the electrical signal, and so on. The variable wave plate 1121 may also use various devices capable of changing polarization of the beam according to the electrical signal.

Accordingly, in FIG. 1, the linear polarization direction converter 1120 includes the variable wave plate 1121 and the quarter wave plate 1122, but the present disclosure is not limited thereto.

For example, when a full wave liquid crystal waveplate is used as the variable wave plate 1121, the linear polarization direction converter 1120 may be configured without the quarter wave plate 1122. In addition, when a bandwidth of a light source is wide, in order to rotate a polarization direction of light in a wide wavelength region without wavelength dependence, the variable wave plate 1121 and the quarter wave plate 1122 illustrated in FIG. 1 are removed, and the polarization direction may be rotated by using a method of mechanically rotating the polarizer 1110 by using a motor or the like.

To this end, the linear polarization direction converter 1120 may include the polarizer 1110 and a motor (not illustrated). In this case, the polarizer 1110 generates a linearly polarized beam by receiving a light source having random polarization. At this time, the motor may rotate an angle of the polarizer 1110 according to the phase modulation signal of the signal generator 1125 to vary a polarization direction of the linearly polarized beam passing through the polarizer 1110 and transfer the linearly polarized beam to the collimator 1130. In this case, the same effect as before may be obtained.

In FIG. 1, for the sake of convenient description, a linearly polarized beam is formed by the polarizer 1110, the variable wave plate 1121 retards a phase of an incident linearly polarized beam to change polarization and transfer the linearly polarized beam, and the quarter wave plate 1122 generates a linearly polarized beam whose polarization direction is rotated, but the direction of the linearly polarized beam may also be changed through various combinations using a half wave plate, a quarter wave plate, a polarizer, and a variable wave plate. That is, the linear polarization direction converter 1120 may be implemented with various devices capable of changing a polarization direction of a linearly polarized beam by phase-retarding the linearly polarized beam.

The collimator 1130 expands a beam outputted from the linear polarization direction converter 1120 and transfers the beam to the polarization-sensitive lens 1140 and may be implemented as various devices capable of expanding the beam.

The polarization-sensitive lens 1140 receives an expanded linearly polarized beam by passing through the linear polarization direction converter 1120 and simultaneously generate a first spherical wave of right-handed circular polarized light having a negative focal length and a second spherical wave of a left-handed circular polarized light having a positive focal length.

Here, the polarization-sensitive lens 1140 may be configured by a geometric phase lens. The geometric phase lens 1140 is a thin plate-shaped structure having a Pancharatnam-phase effect based on a liquid crystal and acts as a lens that changes a wavefront of an incident beam according to polarization of the inputted light to a wavefront having a positive and negative focal length. The geometric phase lens may be made by using an analog hologram recording device based on a Mach-Zehnder interferometer as known, and for example, a ready-made product provided by the ImagineOptix company may be used therefor.

Figure 2:
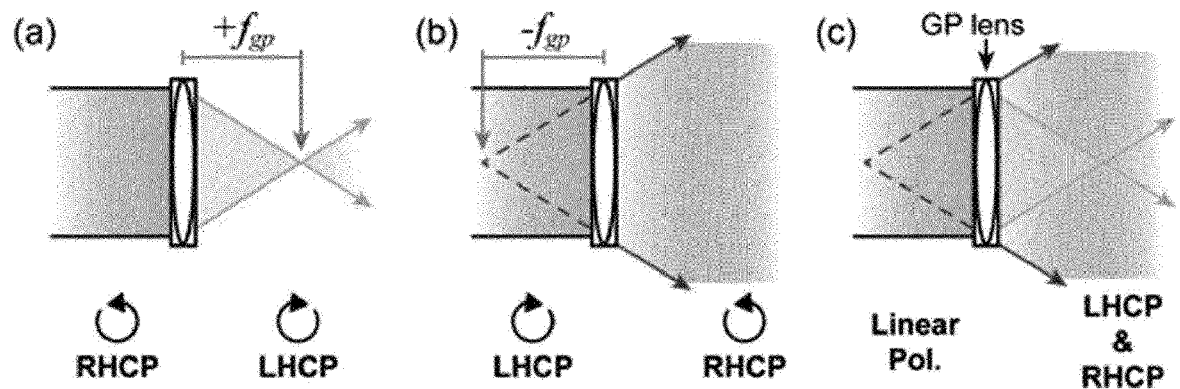
FIG. 2 illustrates diagrams for showing a principle of a polarization-sensitive lens according to an embodiment of the present disclosure.

FIG. 2 illustrates diagrams for showing a principle of a polarization-sensitive lens according to an embodiment of the present disclosure.

As illustrated in (a) of FIG. 2, when a right-handed circular polarized beam is incident, the geometric phase lens 1140 acts as a convex lens in response to a corresponding polarization direction, thereby generating a spherical wave of the left-handed circular polarized light having a positive focal length $+f_{gp}$, and as illustrated in (b) of FIG. 2, when the left-handed circular polarized beam is incident, the geometric phase lens 1140 acts as a concave lens in response to a corresponding polarization direction, thereby generating a spherical wave of the right-handed circular polarized light having a negative focal length $-f_{gp}$.

However, in the embodiment of the present disclosure, as illustrated in (c) of FIG. 2, a wavefront of linearly polarized beam is inputted to the geometric phase lens 1140, and in this case, the geometric phase lens 1140 divides energy intensity of the inputted light by almost half and simultaneously generates a wavefront of a spherical wave (hereinafter, referred to as a first spherical wave) of a right-handed circular polarized light having a negative focal length $-f_{gp}$ and a wavefront of a spherical wave (hereinafter, referred to as a second spherical wave) of a left-handed circular polarized light having a positive focal length $+f_{gp}$.

In this way, the geometric phase lens 1140 changes some of the incident linearly polarized beams into right-handed circular polarized beams to form a first spherical wave that locates a focal point on a side opposite to a travel direction of the incident beam, and at the same time changes the rest into left-handed circular polarized beams to form a second spherical wave that locates a focal point toward a travel direction of the incident beam.

As described above, according to the embodiment of the present disclosure, a scan pattern is formed in a single optical path by using a polarization-sensitive lens, and thus, it is possible to provide an optical scanning holography with higher efficiency and higher quality than a technique of the related art which separates a light source into two paths and then recombines to form an interference pattern, and also there is an advantage of being robust and stable against external environment by using an optical system structure with high stability and low complexity.

The first and second spherical waves extracted in line from the polarization-sensitive lens 1140 are transferred to the polarizer 1150 (linear polarizer).

The polarizer 1150 transmits therethrough only a beam component in a predetermined polarization direction among components of the first and second spherical waves transferred from the geometric phase lens 1140. That is, the polarizer 1150 passes only a polarized beam corresponding to the polarization direction of the polarizer 1150 previously set and transfers the polarized beam to the scanning unit 1160.

The scanning unit 1160 scans a scan object 1010 (hereinafter, referred to as an object) by using an interference beam (interference pattern) generated between the first and second spherical waves passing through the polarizer 1150. In the present embodiment, the scanning unit 1160 uses a mirror scanner.

The mirror scanner includes an X-Y scanner having a horizontal scan mirror that scans the object 1010 in the X direction and a vertical scan mirror that scans the object 1010 in the Y direction. Of course, in the present disclosure, the scanning unit 1160 is not limited to a mirror scanner, and similar units or other known scanning unit may be used therefor.

The scanning unit 1160 is operated by receiving a scan control signal from the scan controller 1185, and the scan controller 1185 generates a scan control signal for controlling a scan position of the scanning unit 1160. Here, the scan control signal may include a horizontal scan signal and a vertical scan signal for controlling the horizontal and vertical scan mirrors in a horizontal direction and a vertical direction, respectively.

In FIG. 1, a phase modulation signal of the signal generator 1125 is a periodic ramp signal whose phase retardation value linearly varies with time and is represented as a function of $\Omega(t)$. Here, the signal generator 1125 generates two functions, that is, $\Omega(t)$ and $\sin(12\Omega(t))$, and transfers the periodic ramp signal $\Omega(t)$ to the linear polarization direction converter 1120 and transfers a heterodyne reference signal $\sin(12\Omega(t))$ to the heterodyne detector 1181 of the electronic processor 1180.

Figure 3:
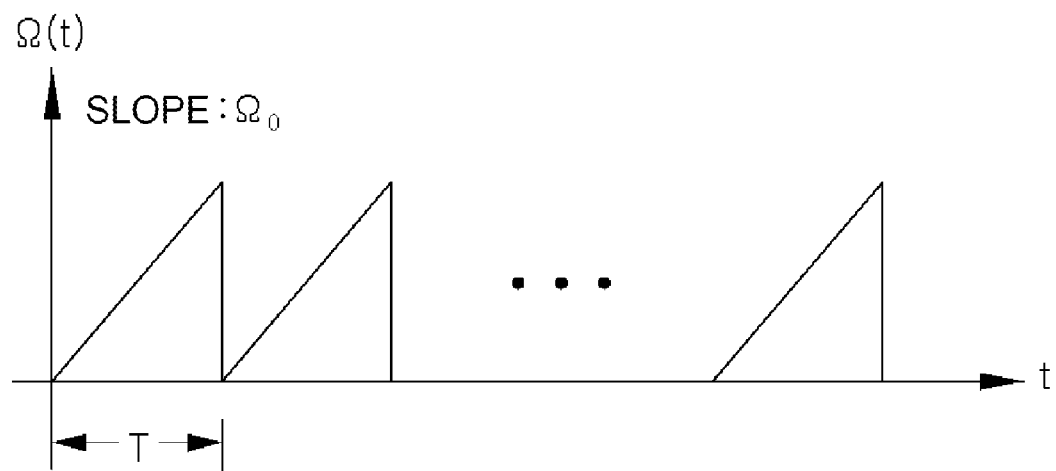
FIG. 3 is a diagram illustrating a periodic ramp signal generated by a signal generator of FIG. 1.

FIG. 3 is a diagram illustrating the periodic ramp signal generated by the signal generator of FIG. 1.

As illustrated in FIG. 3, the signal generator 1125 generates the ramp signal $\Omega(t)$ that varies according to time t in a setting period T. The periodic ramp signal according to the time t has a slope of $\Omega 0$ and may be represented as a function of $\Omega(t)=\Omega_0 t$ having a value between 0 and $\pi$.

That is, a function generator of the signal generator 1125 may generate the periodic ramp signal $\Omega(t)$ that causes $2\Omega(t)$ to change linearly with time from 0 to $2\pi$ and apply the ramp signal to the variable wave plate 1121.

As such, when the phase modulation signal applied to the variable wave plate 1121 is a periodic ramp signal, an interference beam due to the two spherical waves has a form of a heterodyne-modulated nonlinear Fresnel zone plate with time and may be defined as following Equation 1.

$$I_{fgp}(x_0, y_0; z) = \cos\left[\frac{2\pi f_{gp}}{\lambda(2f_{gp}+z)z}(x_0^2 + y_0^2) + 2\Omega_0 t\right] \quad \text{Equation 1}$$

Here, k is a wavelength of a used beam, $f_{gp}$ is a focal length of the polarization-sensitive lens 1140, $(x_0^2+y_0^2)$ is a Catharsian coordinate system with a plane orthogonal to an optical axis of the linearly polarized beam as $(x_0,y_0)$, z is a distance from a focal point of the second spherical wave to the object, and $\Omega_0$ is a slope of a function $\Omega(t)$ function.

The first photodetector 1175 detects a beam reflected from the object 1010. The beam reflected from the object 1010 at a scan position of a scan beam designated by the scanning unit 1160 is spatially integrated by the first light integrator 1170. Here, the first light integrator 1170 may be configured by a lens and may be configured by various known integration units such as an imaging or non-imaging light integrator including a concave reflection mirror.

The first photodetector 1175 detects the spatially integrated beam through the first light integrator 1170 and converts the beam into a current signal. At this time, the first photodetector 1175 generates a current according to intensity of the spatially integrated beam. The first photodetector 1175 may be configured by using a photodiode, but the present disclosure is not limited thereto, and various photodetection units such as a photo-multiplier tube may be applied. In addition, even without the first light integrator 1170, light transferred to a detection surface of the first photodetector 1175 may also be directly detected.

The electronic processor 1180 generates a hologram of the object 1010 by processing a signal detected by the first photodetector 1175. The electronic processor 1180 may include a heterodyne detector 1181, an AD converter 1182, a signal processor 1183, a storage 1184, and a scan controller 1185.

The heterodyne detector 1181 processes a current signal received from the first photo detector 1175 to generate an in-phase output signal and a quadrature-phase output signal.

The heterodyne detector 1181 generates an in-phase signal as a first output by using the received current signal and sin(12Ω(t)) which is a modulation signal generated by the function generator of the signal generator 1125 and generates a quadrature-phase signal as a second output. The in-phase output signal and the quadrature-phase output signal correspond to a pattern in which a three-dimensional image of an object is encoded by a nonlinear Fresnel zone plate.

The analog to digital converter 1182 has two input channels and receives an in-phase signal and a quadrature-phase signal through each channel and converts the signals into digital signals. The converted digital current signals are provided to the signal processor 1183 together with a scan position of the scanning unit 1160.

The signal processor 1183 generates a complex hologram of the object 1010 from the digital signal, and the storage 1184 stores the generated complex hologram. In addition, the scan controller 1185 generates a control signal for changing a scan position of the scanning unit 1160 whenever hologram processing for a certain position of the object 1010 is completed, and transfers the control signal to the scanning unit 1160.

Of course, in the first embodiment of the present disclosure illustrated in FIG. 1, heterodyne detection is performed before conversion to a digital signal is performed through the AD converter 1182, but a current signal provided by the first photodetector 1175 and a signal generated by the signal generator 1125 is converted into a digital signal through the AD converter 1182, and then the AD converter 1182 also performs digital heterodyne detection by using a digital signal processing method to transfer signals to the signal processor 1183. In this case, a configuration of the heterodyne detector 1181 is unnecessary.

Figure 4:
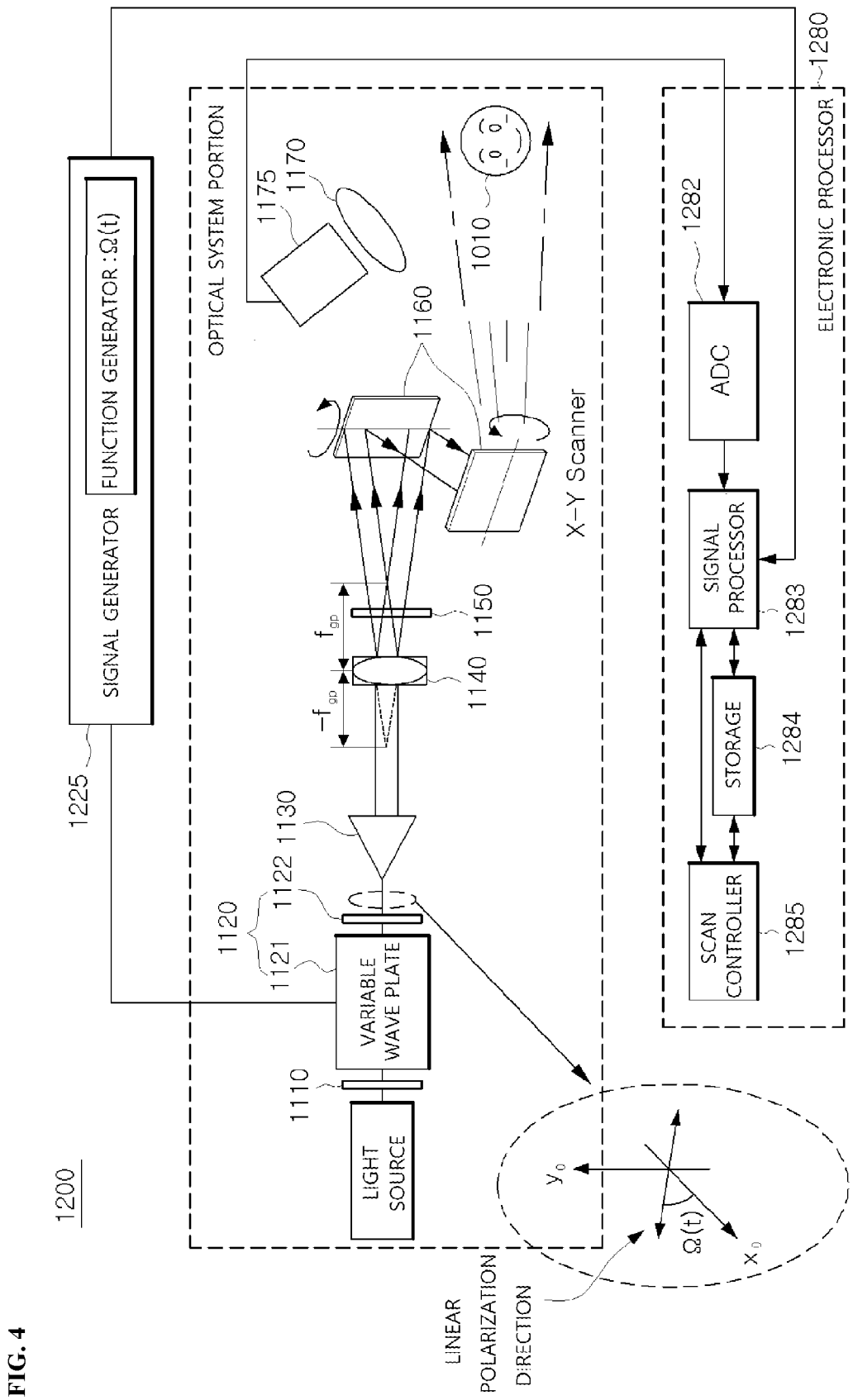
FIG. 4 is a diagram illustrating a second embodiment of the in-line scanning holography system according to the present disclosure.

FIG. 4 is a diagram illustrating a second embodiment of the in-line scanning holography system according to the present disclosure.

As illustrated in FIG. 4, the in-line scanning holography system 1200 according to the second embodiment includes a polarizer 1110, a linear polarization direction converter 1120, a signal generator 1225, a collimator 1130, a polarization-sensitive lens 1140, a polarizer 1150, scanning unit 1160, a light integrator 1170, a first photodetector 1175, and an electronic processor 1280. In FIG. 4, components having the same reference numerals as in the first embodiment of FIG. 1 perform the same operation, and thus, additional description thereon is omitted.

In FIG. 4, a phase modulation signal generated by the signal generator 1225 corresponds to a phase shift signal whose phase retardation value is discontinuously shifted in the order of (0, π/2, π) with time, unlike FIG. 1. Accordingly, a function generator of the signal generator 1225 generates a phase shift signal Ω(t) that causes Ω(t) to be shifted in the order of {0, π/2, π} and applies the phase shift signal to a variable wavelength plate 1121.

In this case, an interference beam may be defined by following Equation 2 as a form of a heterodyne-modulated nonlinear Fresnel zone plate with time.

$$I(x_0, y_0; z) = \cos\left[\frac{2\pi f_{gp}}{\lambda(2f_{gp} + z)z}(x_0^2 + y_0^2) + p_n\right]$$

Equation 2

Here, λ is a wavelength of a used beam, $f_{gp}$ is a focal length of the polarization-sensitive lens 1140, $(x_0^2+y_0^2)$ is a Catharsian coordinate system with a plane orthogonal to an optical axis of a linearly polarized beam as $(x_0, y_0)$, z is a distance from a focal point of the second spherical wave to an object, and $P_n$ is a set of n different phases {0, π/2, π} used for phase shifting.

In FIG. 4, the signal generator 1225 generates only an Ω(t) signal, and the electronic processor 1280 does not need to be include the heterodyne detector 1181 and detects a hologram signal having a phase shifted by using a digital signal processing method.

The AD converter 1282 of the electronic processor 1280 converts the signal detected by the first photodetector 1175 into a digital signal and detects a hologram signal having a phase shifted by using a digital signal processing method. The signal processor 1283 generates a complex hologram of the object 1010 from the hologram signal having a shifted phase, and the storage 1184 stores the complex hologram. The scan controller 1284 generates a control signal for changing a position of the scanning unit 1160 whenever hologram processing for a certain position of the object 1010 is completed.

Figure 5:
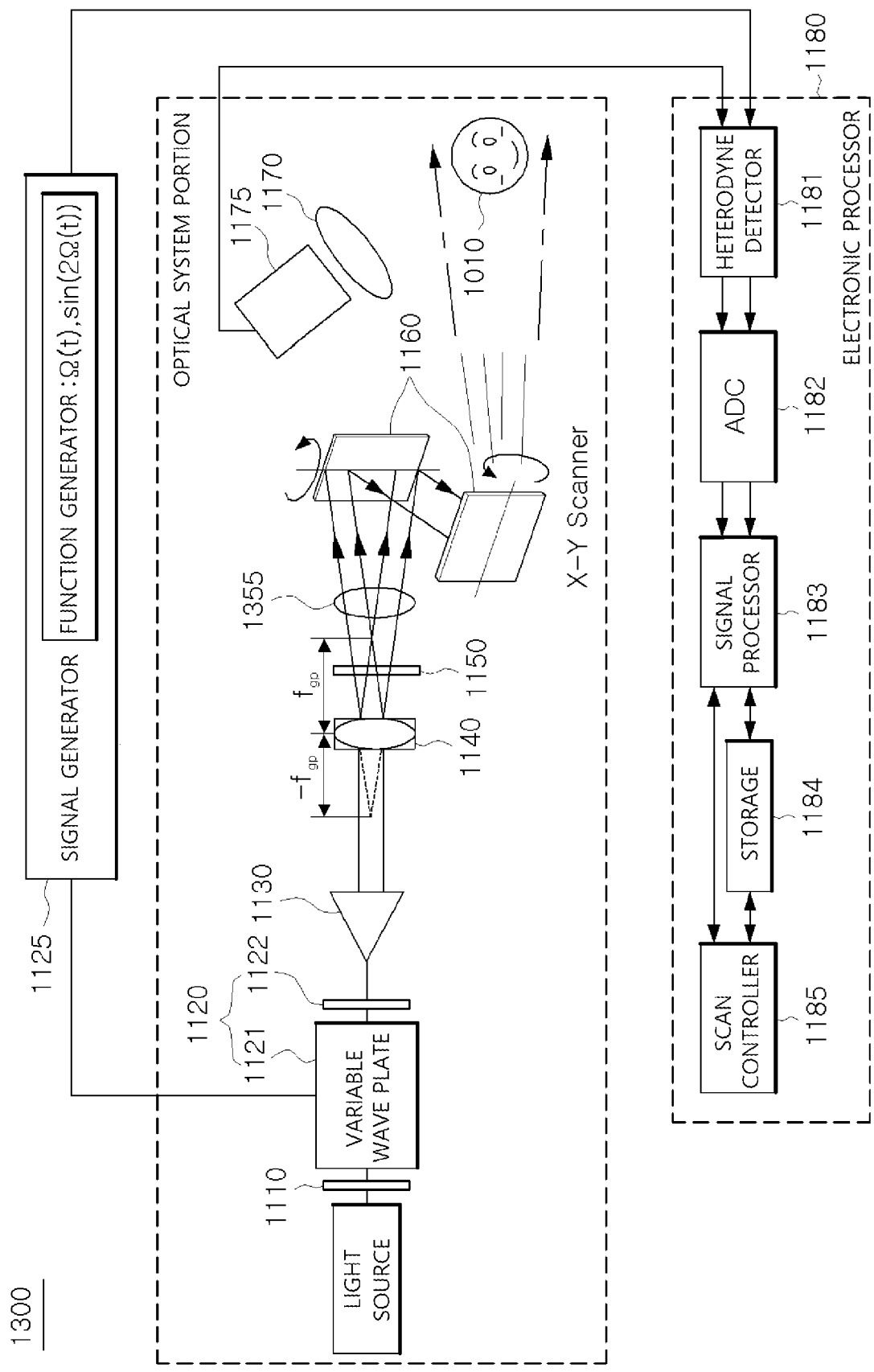
FIG. 5 is a diagram illustrating a third embodiment of the in-line scanning holography system according to the present disclosure.

FIG. 5 is a diagram illustrating a third embodiment of the in-line scanning holography system according to the present disclosure.

As illustrated in FIG. 5, the in-line scanning holography system 1300 according to the third embodiment includes a polarizer 1110, a linear polarization direction converter 1120, a signal generator 1125, a collimator 1130, a polarization-sensitive lens 1140, a polarizer 1150, a first lens 1355, scanning unit 1160, a light integrator 1170, a first photodetector 1175, and an electronic processor 1180.

FIG. 5 illustrates that the first lens 1355 is additionally added to the structure according to the first embodiment of FIG. 1, and additional description on the components having the same reference numerals is omitted.

In FIG. 5, the first lens 1355 is provided between the polarization-sensitive lens 1140 and the scanning unit 1160 to adjust a distance between respective focal points of the first and second spherical waves and acts as an imaging lens for imaging a pattern of a surface of the polarization-sensitive lens on a surface of an object region.

That is, when the surface of the geometric phase lens is imaged in the object region by being enlarged or reduced by the first lens 1355, a pattern on the surface of the geometric phase lens may be imaged and projected on the object.

When a focal position of the first spherical wave is referred to as f1 and a focal position of the second spherical wave is referred to as f2, a distance between the positions f1 and f2 in FIG. 1 is $2f_{gp}$, but in FIG. 5, the distance between the positions f1 and f2 is changed to $2M^2_{img}f_{gp}$ according to a reduction or enlargement rate of the first lens 1355.

In addition, in FIG. 5, an interference beam may be defined by following Equation 3 as a form of a heterodyne-modulated non-linear Fresnel zone plate with time.

$$I(x_\theta, y_0; z_{img}) = \cos\left[\frac{2\pi M_{img}^2 f_{gp}}{\lambda(2M_{img}^2 f_{gp} + z_{img})z_{img}}(M_{img}^2 x_0^2 + M_{img}^2 y_0^2) + 2\Omega_0 t\right]$$

Equation 3

Here, $M_{img}$ is a reduction or enlargement rate of an image generated by the first lens 1355 when imaging a pattern of a surface of the polarization-sensitive lens (geometric phase lens) on a surface of the object region, $z_{img}$ is a distance from a focal point of the second spherical wave to the object, $2M^2_{img}f_{gp}$ is a distance between respective focal points of the adjusted first and second spherical waves.

In this way, by placing the first lens 1355 between the polarization-sensitive lens 1140 and the object 1010, new first and second spherical waves in which a distance between two focal points of the two spherical waves is changed may be placed on a surface of the object by using an enlargement or reduction method.

Here, the embodiments of the present disclosure described above exemplify that an object is placed in a region where the two spherical waves perform emanation, but the object may be placed between (a point between the positions f1 and f2) the focal points of the two spherical waves by using a method of increasing a resolution in a microscope application of a heterodyne scanning-based hologram.

To this end, a hologram of the object encoded to an interference pattern of a reverse curvature of an emanating spherical wave and a converging spherical wave may be obtained by placing an imaging lens between the polarization-sensitive lens (geometric phase lens) and the object by using a method of placing the focal position f1 of the first spherical wave in the front of the object and placing the focal position f2 of the second spherical wave to the rear of the object, and thus, the hologram may be recovered numerically to increase a resolution.

For example, a hologram encoded to an interference pattern of the converging first spherical wave and the emanating second spherical wave may be obtained when imaging the surface of the geometric phase lens on a surface of the object, by placing an imaging lens between the geometric phase lens and the object, and in this case, the interference pattern may be defined by following Equation 4.

$$I(x_0, y_0; z_{img}) = \cos\left[\frac{2\pi M^2_{img}f_{gp}}{\lambda(z^2_{img} - M^4_{img}f^2_{gp})}(M^2_{img}x_0^2 + M^2_{img}y_0^2) + 2\Omega_0 t\right]$$ Equation 4

Here, $M_{img}$ is a reduction or enlargement rate of an image generated by an imaging lens when imaging a pattern of a surface of the polarization-sensitive lens (geometric phase lens) on a surface of an object, and $z_{img}$ is a distance from a focal point of the second spherical wave to the object.

In addition, according to the embodiment of the present disclosure, an interference pattern between a plane wave and a spherical wave may be formed by placing a second lens (not illustrated) between the polarization-sensitive lens 1140 and the scanning unit 1160.

In general, an optical scanning holography scans an object with a linear Fresnel zone plate in which a spherical wave and a plane wave interfere with each other, and thereby, a hologram of the object is obtained. Interference patterns of the plane wave and the spherical wave may be formed by placing a lens between the geometric phase lens and the object. Accordingly, a hologram encoded by the linear Fresnel zone plate, which is an interference pattern formed by interference between the spherical wave and the plane wave, may be obtained.

This will be described in detail as follows. In this case, for the sake of convenient description, it is assumed that the second lens is arranged instead of the first lens in a place of a reference numeral 1355 of FIG. 5.

The second lens (not illustrated) is arranged between the polarization-sensitive lens 1140 and the scanning unit 1160 and is arranged to form a focal point is formed at the same focal position f2 as the second spherical wave. As described above, when the focal position of the second lens (not illustrated) and the focal position of the second spherical wave are the same as each other, the second spherical wave is converted into a plane wave, and a curvature of the spherical wave is added to the first spherical wave by the second lens.

In this case, an interference beam may be defined by following Equation 5 as a is of a linear Fresnel zone plate formed by interference between the first spherical wave and the plane wave.

$$I(x_0, y_0; z) = \cos\left[\frac{\pi}{\lambda z}(x_0^2 + y_0^2) + 2\Omega_0 t\right]$$ Equation 5

Here, z is a distance from a focal position of the first spherical wave to which a curvature is added by the second lens to the object.

In this way, when the second lens is inserted such that a focal position of the second lens is the same as a focal position of the second spherical wave, a hologram encoded by the linear Fresnel zone plate, which is an interference pattern between a spherical wave and a plane wave, may be obtained.

Figure 6:
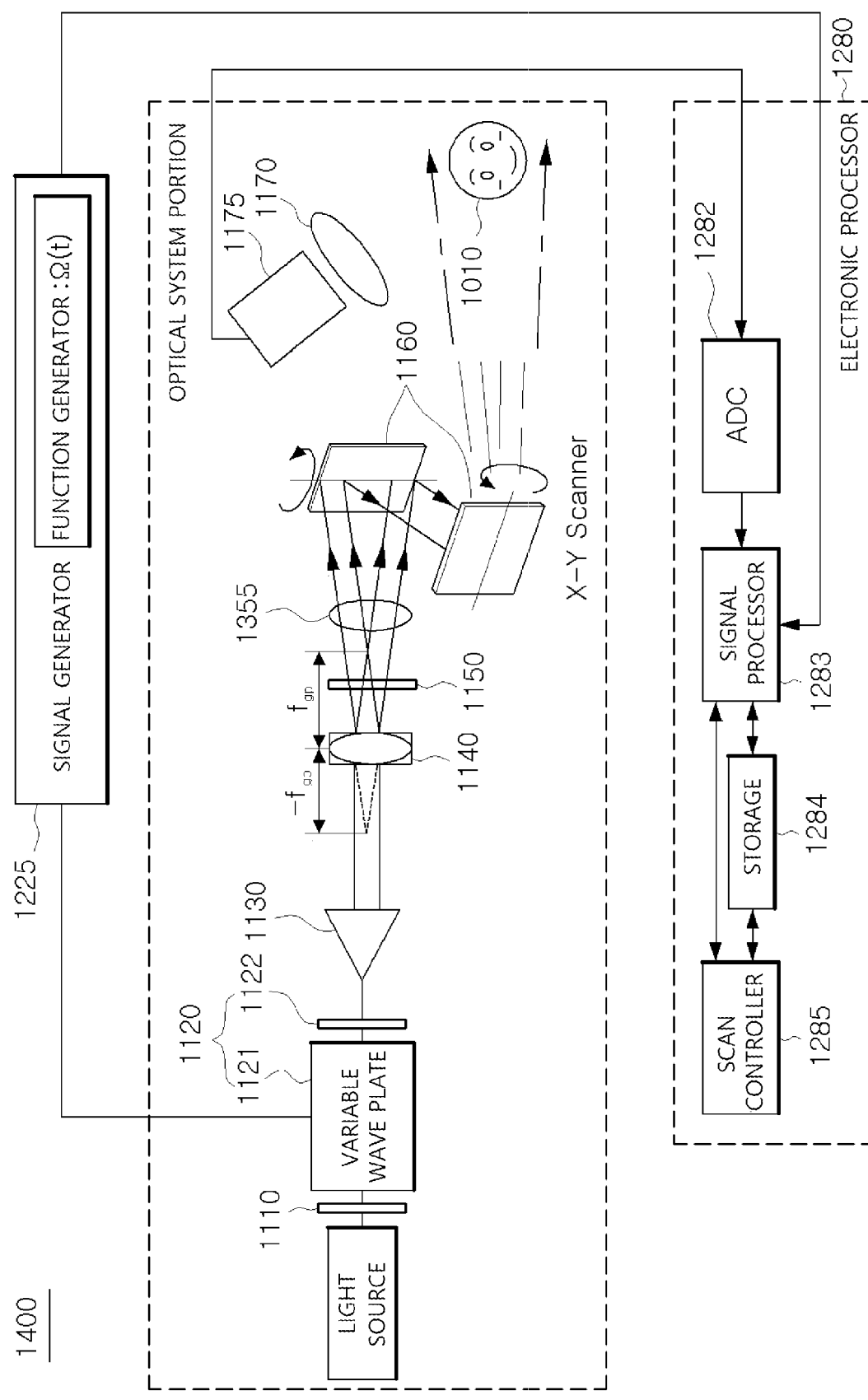
FIG. 6 is a diagram illustrating a fourth embodiment of the in-line scanning holography system according to the present disclosure.

FIG. 6 is a diagram illustrating a fourth embodiment of an in-line scanning holography system according to the present disclosure.

As illustrated in FIG. 6, the in-line scanning holography system 1400 according to the fourth embodiment includes a polarizer 1110, a linear polarization direction converter 1120, a signal generator 1225, a collimator 1130, a polarization-sensitive lens 1140, a polarizer 1150, a first lens 1355, scanning unit 1160, a light integrator 1170, a first photodetector 1175, and an electronic processor 1280.

FIG. 6 corresponds to a structure in which the first lens 1355 (or second lens) described above is combined with the configuration of FIG. 4 according to the second embodiment, and thus, redundant description thereon is omitted.

Meanwhile, the above-described embodiments of the present disclosure exemplifies that a geometric phase lens is used as a polarization-sensitive lens, but various lenses with different focal lengths depending on polarization, such as, a polarization sensitive transmission liquid crystal graded index lens (GRIN) formed of a liquid crystal may be used therefor.

For example, a polarization-sensitive transmissive liquid crystal GRIN lens, which is composed of liquid crystals aligned in a p-polarized direction and refracts p-polarized light and passes s-polarized light, may be aligned in the x-direction of the Cartesian coordinate system, and a quarter wave plate may be inserted between the polarization-sensitive transmissive liquid crystal GRIN lens and the polarizer 1150. In this case, light outputted from a light source is linearly polarized through the polarizer 1110 and transferred to the variable wave plate 1121, and the linearly polarized beam whose polarization direction is changed in the variable wave plate 1121 is expanded by the collimator 1130, and then, while passing through the polarization-sensitive transmissive liquid crystal GRIN lens, a portion corresponding to a p-polarization direction forms a spherical wave, and a portion corresponding to a s-polarization direction forms a plane wave. At this time, the spherical wave of the p-polarized portion and the plane wave of the s-polarized portion are converted into a right-handed circular polarized beam and a left-handed circular polarized beam, respectively, by a quarter wave plate between the polarization-sensitive transmissive liquid crystal GRIN lens and the polarizer 1150 and the converted beam passes through the polarizer 1150 to form a linear Fresnel zone plate which is an interference pattern formed by interference between a plane wave and a spherical wave, as represented by Equation 5.

In addition, in order to form a nonlinear Fresnel zone plate and a reverse curvature Fresnel zone plate of Equation 3 to Equation 5, it is described that a lens (first or second lens) is inserted between the geometric phase lens and the object for the sake of convenient description, but it goes without saying that Equation 3 to Equation 5 may be formed by inserting a lens between the collimator 1130 and the polarization-sensitive lens 1140.

Figure 7:
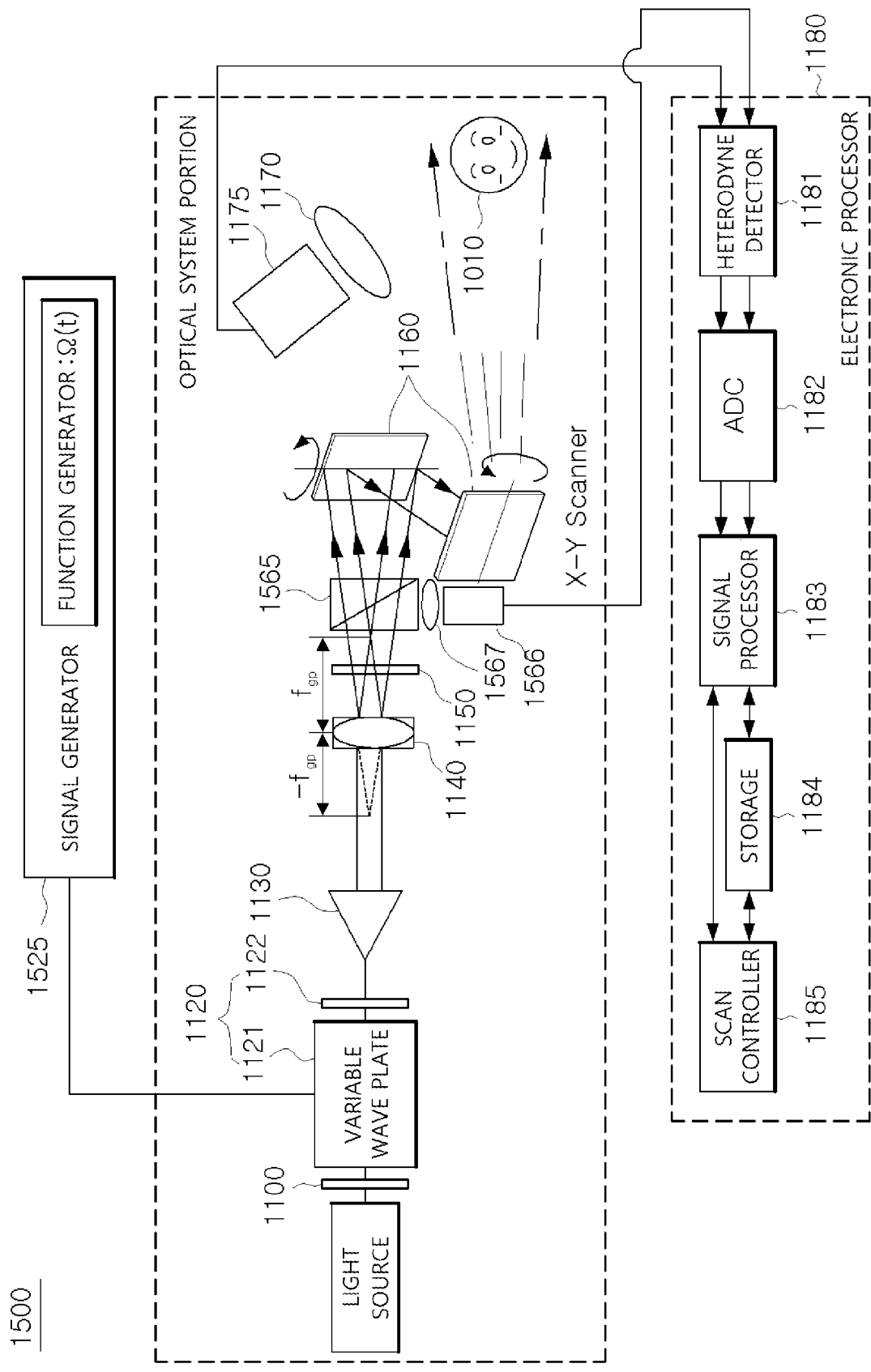
FIG. 7 is a diagram illustrating a fifth embodiment of the in-line scanning holography system according to the present disclosure.

In addition, in the first and third embodiments illustrated in FIGS. 1 and 5, the function generator generates $\Omega(t)$ that is a modulation signal of the variable wave plate 1121 to transfer $\Omega(t)$ to the variable wave plate 1121 and generates $\sin(12\Omega(t))$ that is a heterodyne reference signal to transfer $\sin(12\Omega(t))$ to the heterodyne detector 1181, but the heterodyne reference signal may also be generated by using a beam splitter and a second photodetector as illustrated in FIG. 7 to be described below.

FIG. 7 is a diagram illustrating a fifth embodiment of the in-line scanning holography system according to the present disclosure.

As illustrated in FIG. 7, the in-line scanning holography system 1500 according to the fifth embodiment includes a polarizer 1110, a linear polarization direction converter 1120, a signal generator 1125, a collimator 1130, a polarization-sensitive lens 1140, a polarizer 1150, scanning unit 1160, a light integrator 1170, a first photodetector 1175, a beam splitter 1565, a second photodetector 1566, and an electronic processor 1180.

FIG. 7 corresponds to a case in which the beam splitter 1565 and the second photodetector 1566 are added to the configuration of FIG. 1. The beam splitter 1565 is provided between the polarizer 1150 and the scanning unit 1160 to transmit therethrough some of beams passing through the polarizer 1150 to transfer the beams to the scanning unit 1160 and reflects the rest of the beams.

The second photodetector 1566 is on a path of a beam reflected by the beam splitter 1565 and detects a beam reflected from the beam splitter 1565. Of course, the beam reflected from the beam splitter 1565 is spatially integrated by the second light integrator 1567 and then detected by the second photodetector 1566.

The second photodetector 1566 detects the reflected beam and generates a beating signal $\sin(12\Omega(t))$ based on the beam. It may be seen that the beating signal is the same as the heterodyne reference signal used previously. Accordingly, the second photodetector 1566 may input the beating signal to the heterodyne detector 1181 as a reference signal.

In the fifth embodiment, the signal generator 1525 generates a periodic ramp signal $\Omega(t)$ and applies the periodic ramp signal to the linear polarization direction converter 1120, and the second photodetector 1566 applies the heterodyne reference signal $\sin(12\Omega(t))$ generated based on the reflected beam to the heterodyne detector 1181 of the electronic processor 1180.

Although it is described that the first to fifth embodiments integrate light reflected from the object 1010, when the object 1010 is a fluorescent substance, fluorescent light from the object 1010 is integrated by the first light integrator 1170 and transferred to the first photodetector 1175, and the first photo detector 1175 may detect a spatially integrated beam through the first light integrator 1170 to record a hologram of the fluorescent substance. At this time, an optical filter including a dichroic mirror that filters light corresponding to a wavelength of fluorescent light from the object 1010 and transfers the light to the first photodetector 1175 is provided between the first photodetector 1175 and the object 1010, thereby reducing optical noise.

In addition, when the object 1010 is a transmissive object 1010 that transmits light therethrough, the first light integrator 1170 and the first photodetector 1175 are located in a path of the light passing through the object 1010 to integrate the light passing through the object by using the first light integrator 1170 and transfer the light to the first photodetector 1175, and the first photodetector 1175 detects a spatially integrated beam through the first light integrator 1170 to record a hologram of the object 1010.

In addition, in the first to fifth embodiments, a Fourier lens and a spatial filter including a pin hole located at a focal point of the Fourier lens are located between the first photodetector 1175 and the object 1010 to spatially filter light reflected from or passing through the object 1010, a hologram including a phase distribution of the object 1010 may be obtained.

According to the in-line scanning holography system according to the present disclosure described above, a high-efficiency and high-quality optical scanning holography may be implemented by forming a scan pattern in a single optical path by using a polarization-sensitive lens and also there is an advantage in that the optical scanning holography is resistant to external environment by using a high-stability and low-complexity optical system structure.

Next, a geometric phase scanning holography system will be described with reference to FIGS. 8 to 11.

The geometric phase scanning holography system proposes a structure capable of obtaining a complex hologram of a real object from which bi-image noise and background noise are removed without a complex modulator for modulating a light signal by using a geometric phase detection method.

Figure 8:
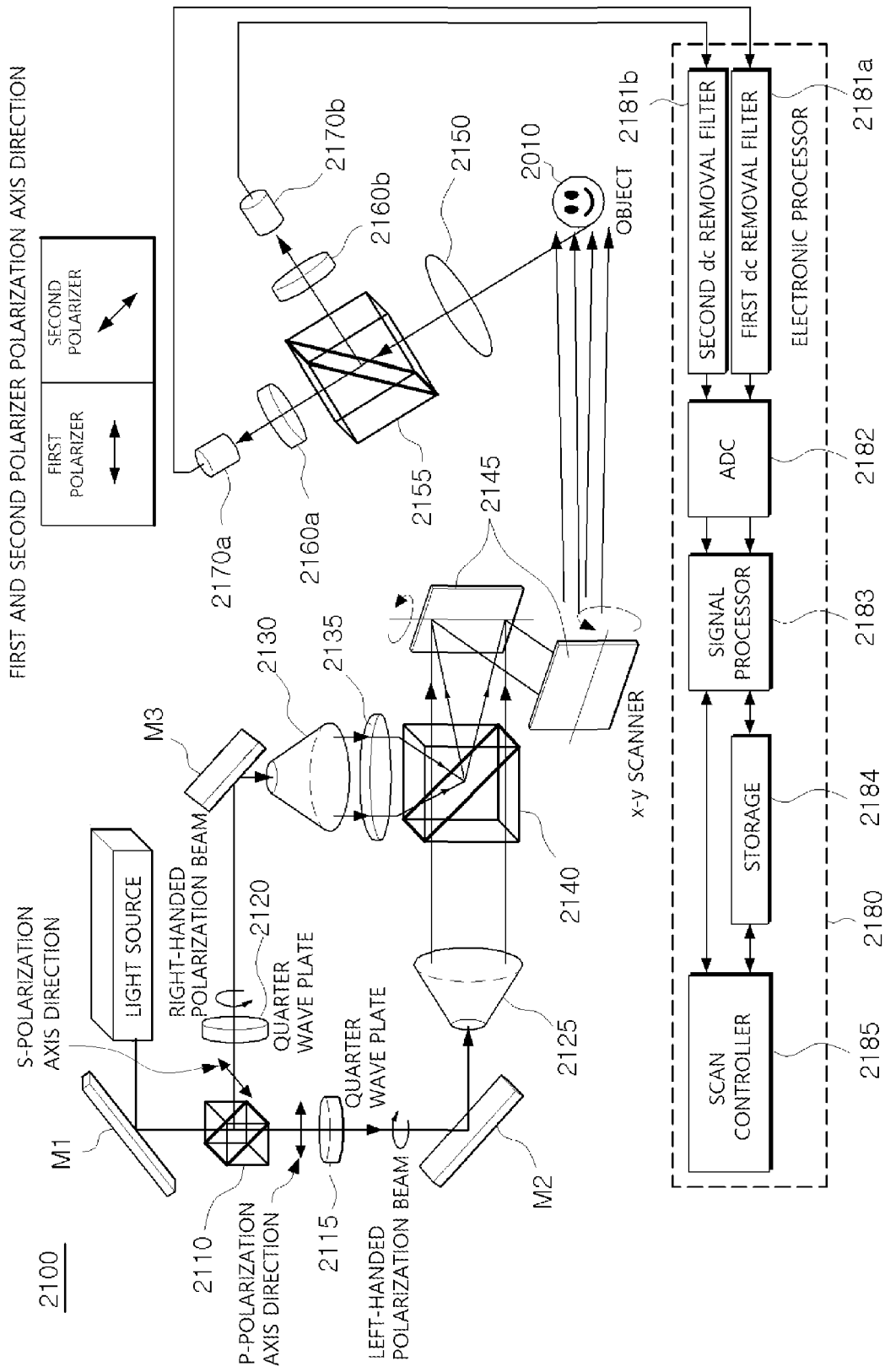
FIG. 8 is a diagram illustrating a first embodiment of a geometric phase scanning holography system according to the present disclosure.

FIG. 8 is a diagram illustrating a first embodiment of a geometric phase scanning holography system according to the present disclosure.

As illustrated in FIG. 8, a geometric phase scanning holography system 2100 according to the first embodiment includes a polarization beam splitter 2110, first and second quarter wave plates 2115 and 2120, first and second collimators 2125 and 2130, a first lens (2135), a first beam splitter (2140), scanning unit 2145, a light integrator 2150, a second beam splitter (2155), first and second polarizers 2160a and 2160b, first and second photodetectors 2170a and 2170b, and an electronic processor 2180.

First, a linearly polarized beam outputted from a light source is transferred to a first mirror M1, and the first mirror M1 causes the received linearly polarized beam to be incident on the polarization beam splitter 2110.

The polarization beam splitter 2110 splits the incident linearly polarized beam into a p-polarized first beam and a s-polarized second beam that are orthogonal to each other.

Among the polarized beams that are mutually orthogonal to a plane perpendicular to a waveguide direction of a beam transferred to the polarization beam splitter 2110, the polarized beam passing through the polarization beam splitter 2110 is referred to as a p-polarized beam, and the polarized beam reflected therefrom is referred to as a s-polarized beam.

An axial direction of the p-polarized beam is denoted by a bidirectional arrow on a path between the polarization beam splitter 2110 and the first quarter wave plate 2115, and an axial direction of the s-polarized beam is denoted by a bidirectional arrow in a direction perpendicular to the axial direction of the p-polarized beam on a path between the polarization beam splitter 2110 and the second quarter wave plate 2120.

Here, a polarization direction of the linearly polarized beam is located in a direction rotated by 45 degrees with respect to the p-polarized axis, and the linearly polarized beam having a direction rotated by 45 degrees with respect to the p-polarization direction is transferred to the polarization beam splitter 2110. Accordingly, the linearly polarized beam is incident in the polarization direction rotated by 45 degrees with respect to the p-polarization axis of the polarization beam splitter 2110.

The polarization beam splitter 2110 transmits therethrough the p-polarized beam of the received linearly polarized beam to transfer the beam to the first quarter wave plate 2115 and reflects the s-polarized beam to transfer the beam to the second quarter wave plate 2120. The first and second quarter wave plates 2115 and 2120 change polarization of the incident beam.

The first quarter wave plate 2115 converts a p-polarized first beam into a left-handed circular polarized beam to transfer the beam to a second mirror M2, and The second quarter wave plate 2120 converts a s-polarized second beam into a right-handed circular polarized beam to transfer the beam to a third mirror M3.

The second mirror M2 transfers the received left-handed circular polarized beam to the first collimator 2125 which is a beam expander, and the third mirror M3 transfers the received right-handed circular polarized beam to the second collimator 2130.

The first collimator 2125 collimates the left-handed circular polarized beam to form a plane wave and transfers the beam to the first beam splitter 2140. That is, the first collimator 2125 expands the left-handed circular polarized beam and provides the plane wave of the left-handed circular polarized light to the first beam splitter 2140.

The second collimator 2130 collimates the right-handed circular polarized beam to form a plane wave and transfers the beam to the first lens 2135. That is, the second collimator 2130 expands the right-handed circular polarized beam and provides the plane wave of the right-handed circular polarized light to the first lens 2135. Here, the first lens 2135 converts the plane wave of the right-handed circular polarized light back into a spherical wave and provides the spherical wave to the first beam splitter 2140.

The plane wave of the left-handed circular polarized light and the spherical wave of the right-handed circular polarized light enter through one side and the other side of the first beam splitter 2140, respectively, and overlap each other. That is, the first beam splitter 2140 forms an interference light by overlapping the plane wave of the left-handed circular polarized beam and the spherical wave of the right-handed circular polarized light, and transfers the formed interference beam to the scanning unit 2145.

In this case, the interference beam may be defined by following Equation 6 in the form of a geometric phase Fresnel zone plate.

$$I_{GP-FZP}(x_\theta, y_0; z) = \cos\left[\frac{\pi}{\lambda z}(x_0^2 + y_0^2) + 2\theta\right] \quad \text{Equation 6}$$

Here, $\lambda$ is a wavelength of a used beam, $(x_0^2+y_0^2)$ is a Catharsian coordinate system with a plane orthogonal to an optical axis of the beam as $(x_0,y_0)$, z is a distance from a focal point of a spherical wave to an object, and $\theta$ is an angle linearly polarized clockwise with respect to a p-polarization axis of the polarization beam splitter.

That is, among the right-handed circular polarized spherical wave and the left-handed circular polarized plane wave overlapped through the first beam splitter 2140 of FIG. 8, an interference pattern of the portion linearly polarized in an axial direction having an angle of $\theta$ clockwise with respect to the p-polarized axis of the polarizing beam splitter 2110 becomes a Fresnel zone plate whose phase is shifted by $2\theta$. At this time, a phase of the interference pattern is shifted by a geometric rotation angle of a polarization axis, and thus, this form is called a geometrical phase Fresnel zone plate.

The scanning unit 2145 scans an object by using the interference beam received from the first beam splitter 2140. The scanning unit 2145 scans an imaging object (hereinafter, referred to as an object) 2010 by using the interference beam as a response command beam.

An intensity pattern of the response command beam for scanning the object may be defined by Equation 7.

$$I(x_0, y_0; z) = \\ I_{GP-FZP}(x_0, y_0; z) + dc = \cos\left[\frac{\pi}{\lambda z}(x_0^2 + y_0^2) + 2\theta\right] + dc \quad \text{Equation 7}$$

Here, dc is the sum of a spherical wave intensity pattern and a plane wave intensity pattern, and in an ideal case, there is no change according to a space, and even in an actual case, dc is a direct current bias component with a very small change according to the space.

In the present embodiment, each of the scanning unit 2145 uses a mirror scanner. The mirror scanner includes an X-Y scanner including a horizontal scan mirror that scans the object 2010 in the X direction and a vertical scan mirror that scans the object in the Y direction. Of course, in the present disclosure, each of the scanning unit 2145 is not limited to the mirror scanner, and a similar unit or other known scanning unit may be used therefor.

In the embodiment of the present disclosure, a beam in which the right-handed circular polarized spherical wave and the left-handed circular polarized plane wave overlap each other is transferred to the mirror-shaped scanning unit 2145, and the scanning unit 2145 moves the geometrical phase Fresnel zone plate across the object, thereby allowing the object to be scanned.

The scanning unit 2145 operates by receiving a scan control signal from the scan controller 2185 provided in the electronic processor 2180, and the scan controller 2185 generates a scan control signal for controlling scan positions of the scanning unit 2145. Here, the scan control signal may include a horizontal scan signal and a vertical scan signal for controlling the horizontal and vertical scan mirrors in a horizontal direction and a vertical direction, respectively.

Of course, instead of using the mirror scanner, the object may be placed on an objective plate and the object may be scanned by horizontally moving the objective plate. In addition to this, the present disclosure may scan an object by using various methods such as a method of using an electrooptic deflector.

The beam reflected from the object 2010 at a scan position of a scan beam designated by the scanning unit 2145 is spatially integrated by the light integrator 2150.

Here, the light integrator 2150 may be configured with a lens and may be configured with various known light integrators such as an imaging or non-imaging light integrator including a concave reflector.

The beam integrated by the light integrator 2150 is transferred to the second beam splitter 2155. The second beam splitter 2155 receives the integrated beam from the light integrator 2150 and separates the beam into first and second output beams. The second beam splitter 2155 transmits therethrough some of the beam integrated by the light integrator 2150 to transfers the beam to the first polarizer 2160*a* and reflects some of the beam to transfer the beam to the second polarizer 2160*b*. That is, the transmitted first output beam is transferred to the first polarizer 2160*a*, and the reflected second output beam is transferred to the second polarizer 2160*b*.

The first and second polarizers 2160*a* and 2160*b* polarize the received first and second output beams, respectively. Here, the second polarizer 2160*b* is located in a polarization direction rotated by 45 degrees clockwise based on the polarization direction of the first polarizer 2160*a*.

The first polarizer 2160*a* transmits therethrough a beam polarized in the polarization direction of the first polarizer 2160*a* among the first output beam received from the second beam splitter 2155 and transfers the transmitted beam to the first photodetector 2170*a*. Likewise, the second polarizer 2160*b* transmits therethrough a beam polarized in the polarization direction of the second polarizer 2160*b* among the received second output beam and transfers the transmitted beam to the second photodetector 2170*b*.

The first and second photodetectors 2170*a* and 2170*b* are installed to correspond to the first and second polarizers 2160*a* and 2160*b* and detect the output beams passing through the first and second polarizers 2160*a* and 2160*b*.

The first and second photodetectors 2170*a* and 2170*b* may be configured by photodiodes, but the present disclosure is not limited thereto, and various photodetectors such as a photo-multiplier tube may be applied thereto. In addition, it is also possible to directly detect light transferred onto a detection surface of the light detector without a light integrator.

The first and second photodetectors 2170*a* and 2170*b* detect a polarized beam in a direction of the first polarizer 2160*a* and a polarized beam in a direction of the second polarizer 2160*b* among the beams spatially integrated by the light integrator 2150 to convert the polarized beams into current signals and generate currents according to intensity of the polarized beams.

That is, the first and second photodetectors 2170*a* and 2170*b* generate first and second current signals in response to the intensity of the first and second output beams passing through the first and second polarizers 2160*a* and 2160*b*.

With respect to a scan position of a scan beam designated by the scanning unit 2145, the first current signal generated by the first photodetector 2170*a* corresponds to a pattern in which a geometric phase Fresnel zone plate in a direction of the first polarizer and the three-dimensional image distribution of the object are encoded, and the second current signal generated by the second photodetector 2170*b* corresponds to a pattern in which a geometric phase Fresnel zone plate in a direction of the second polarizer and a three-dimensional image distribution of the object are encoded.

The polarization direction of the second polarizer 2160*b* is rotated by 45 degrees clockwise based on the polarization direction of the first polarizer 2160*a*. Accordingly, the first and second current signals $$I_0^{dc}(x, y; z) \text{ and } I_{\pi/2}^{dc}(x, y; z)$$

and generated by the first and second photodetectors, respectively, may be defined by following Equation 8 and Equation 9 based on the polarization direction of the first polarizer 2160*a*.

$$I_0^{dc}(x, y; z) = \int O(x_0, y_\theta; z) \otimes \left\{ \cos\left[\frac{\pi}{\lambda z}(x_0^2 + y_0^2)\right] + dc \right\} dz \quad \text{Equation 8}$$

$$I_{\pi/2}^{dc}(x, y; z) = \int O(x_0, y_0; z) \otimes \left\{ \cos\left[\frac{\pi}{\lambda z}(x_0^2 + y_0^2) + \frac{\pi}{2}\right] + dc \right\} dz \quad \text{Equation 9}$$

Here, $O(x_0, y_0; z)$ is a three-dimensional image of an object as a three-dimensional distribution for reflectance of the object, $\otimes$ is a convolution operation, $\lambda$ is a wavelength of a used beam, (x,y) is a scan position of a scan beam designated by the scanning unit, z is a distance (a depth position of the object) from a focal point of a spherical wave to the object, and dc is a DC bias component.

The first and second current signals according to Equation 8 and Equation 9 are transferred to the first and second dc removal filters 2181*a* and 2181*b* of the electronic processor 2180, respectively.

The electronic processor 2180 processes the first and second current signals detected by the first and second photodetectors to generate a complex hologram of the object, and includes the first and second dc removal filters 2181*a* and 2181*b*, the AD converter 2182, the signal processor 2183, the storage 2184, and the scan controller 2185.

The first and second dc removal filters 2181*a* and 2181*b* remove DC bias components, that is, dc components from the first and second current signals, respectively, and input the first and second current signals to the AD converter 2182.

The first and second dc removal filters 2181*a* and 2181*b* remove a portion in which dc and a reflectance distribution of the object are convolved in Equation 8 and Equation 9 to generate signals represented by following Equation 10 and Equation 11 as outputs and transfer the outputs to the converter 2182.

$$I_0(x, y) = \int O\bigl((x_0, y_0; z) \otimes \cos\left[\frac{\pi}{\lambda z}(x_0^2 + y_0^2)\right]\bigr) dz \quad \text{Equation 10}$$

$$I_{\pi/2}(x, y) = \int O(x_0, y_0; z) \otimes \left[\frac{\pi}{\lambda z}(x_0^2 + y_0^2) + \frac{\pi}{2}\right] dz \quad \text{Equation 11}$$

The AD converter 2182 converts the first and second current signals whose dc components are filtered through respective filters into digital signals. The AD converter 2182 includes two input channels to receive in-phase signals of Equation 10 and a $\pi/2$ phase signal of Equation 11 through the respective channels and converts the signals into digital signals.

The signal processor 2183 generates a complex hologram of an object from the converted digital signals, and the storage 2184 stores the generated complex hologram.

In this case, the complex hologram may be defined by following Equation 12.

$$I_H(x, y) = $$
$$I_0(x, y) - jI_{\pi/2}(x, y) = \int O(x_0, y_0; z) \otimes \exp\left[j\frac{\pi}{\lambda z}(x_0^2 + y_0^2)\right]dz \quad \text{Equation 12}$$

Here, $I_0(x,y)$ is a value obtained by removing a dc component from $$I_0^{dc}(x, y; z) \text{ and } I_{\pi/2}(x, y)$$

is a value obtained by removing a dc component from $$I_{\pi/2}^{dc}(x, y; z).$$

The scan controller 2185 generates a control signal for changing positions of the scanning unit 2145 whenever hologram processing for a certain position of an object is completed, and transfers the generated control signal to the scanning unit 2145. Of course, to this end, the signal processor 2183 forms two-dimensional arrays for each scan position by adding Equation 10 and Equation 11 to each other by using a complex addition method as in Equation 12, and the storage 2184 stores the two-dimensional arrays.

Here, instead of omitting the first and second dc removal filters 2181a and 2181b, the AD converter 2182 may receive outputs of the first and second photodetectors 2170a and 2170b and may convert the outputs to digital signals and may remove and filter dc components by using a digital signal processing method.

In addition, the signal processor 2183 forms two-dimensional arrays according to each scan position with respect to Equation 10 and Equation 11 and transfers the two-dimensional arrays to the storage 2184 and then reads the arrays from the storage 2184 when the scan ends to add the two-dimensional arrays corresponding to Equation 10 and Equation 11 by using the complex addition method of Equation 12 and then stores the arrays in the storage 2184 again.

Here, Equation 12 is the same as the complex hologram obtained by using the optical scanning hologram of the related art, which means that a hologram having the same is as in the related art may be generated without using a complicated optical modulator.

In the first embodiment of the present disclosure, a linearly polarized beam is split into a p-polarized beam and a s-polarized beam by the polarization beam splitter 2110, and then a right-handed circular polarized beam and a left-handed circular polarized beam are generated by using the first quarter wave plate 2115 and the second quarter wave plate 2120, but the present disclosure is not limited thereto, and the right-handed circular polarized beam and the left-handed circular polarized beam may be generated by using various known interference units.

Figure 9:
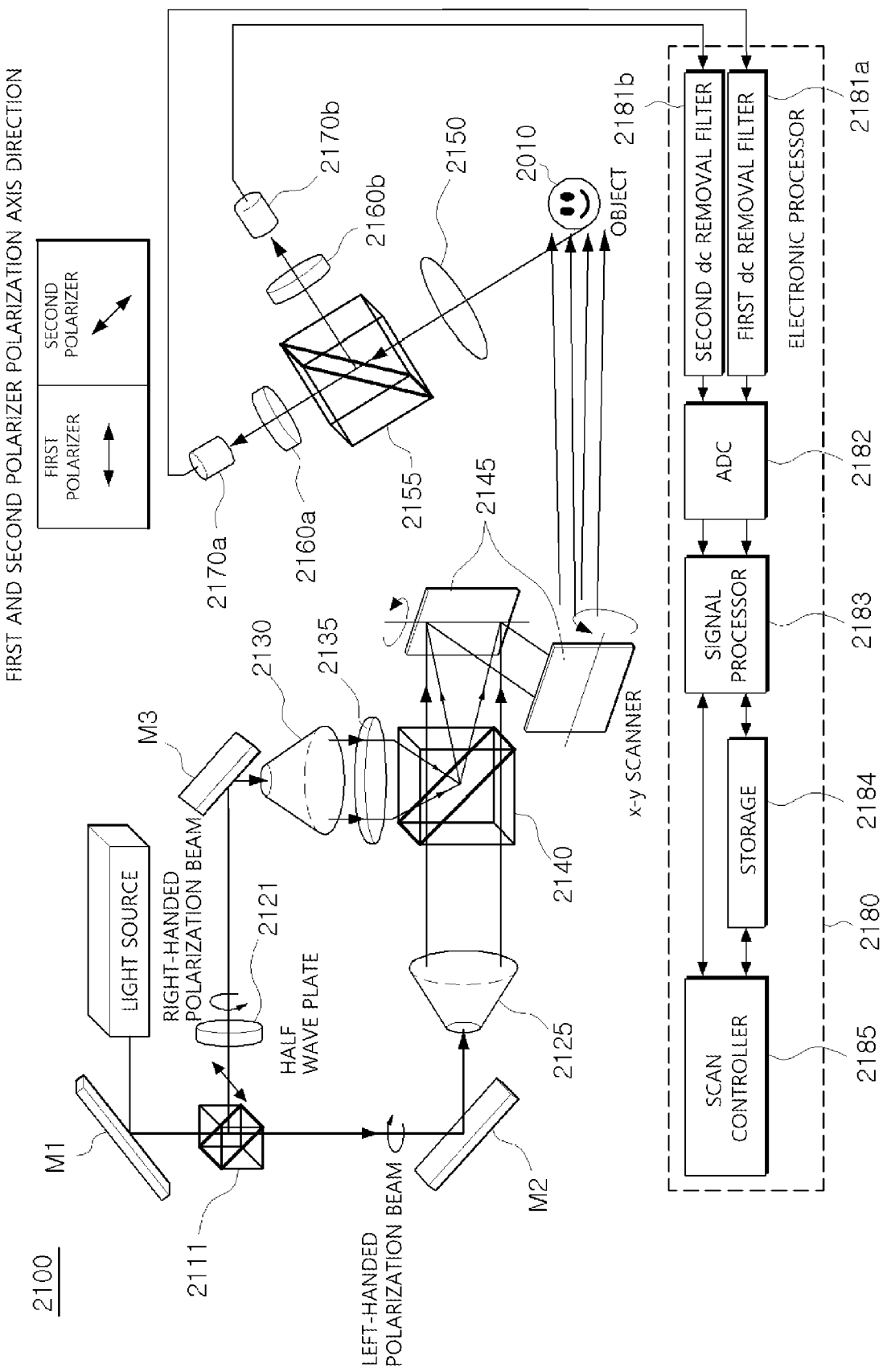
FIG. 9 is a diagram illustrating a modification example of FIG. 8.

FIG. 9 is a diagram illustrating a modification example of FIG. 8. FIG. 9 illustrates another embodiment of generating a left-handed circular polarized beam and a right-handed circular polarized beam.

In FIG. 9, instead of removing the polarization beam splitter 2110, the first quarter wave plate 2115, and the second quarter wave plate 2120 of FIG. 8, the beam splitter 2111 irrelevant to polarization is located at the position of the polarization beam splitter 2110, a half wave plate 2121 is located at the position of the second quarter wave plate 2120, and a light source generates a left-handed circular polarized beam instead of a linearly polarized beam and transfers the left-handed circular polarized beam to the beam splitter 2111.

The beam splitter 2111 transmits therethrough some of the left-handed circular polarized beam incident from the light source to transfer the beam to the second mirror M2 and reflects part thereof to transfer the beam to the half wave plate 2121. The half wave plate 2121 converts the received left-handed circular polarized beam into a right-handed circular polarized beam and transfers the right-handed circular polarized beam to the third mirror M3. That is, even through this method, the right-handed circular polarized beam and the left-handed circular polarized beam may be generated. The subsequent operation is the same as the principle of FIG. 8 described above.

Figure 10:
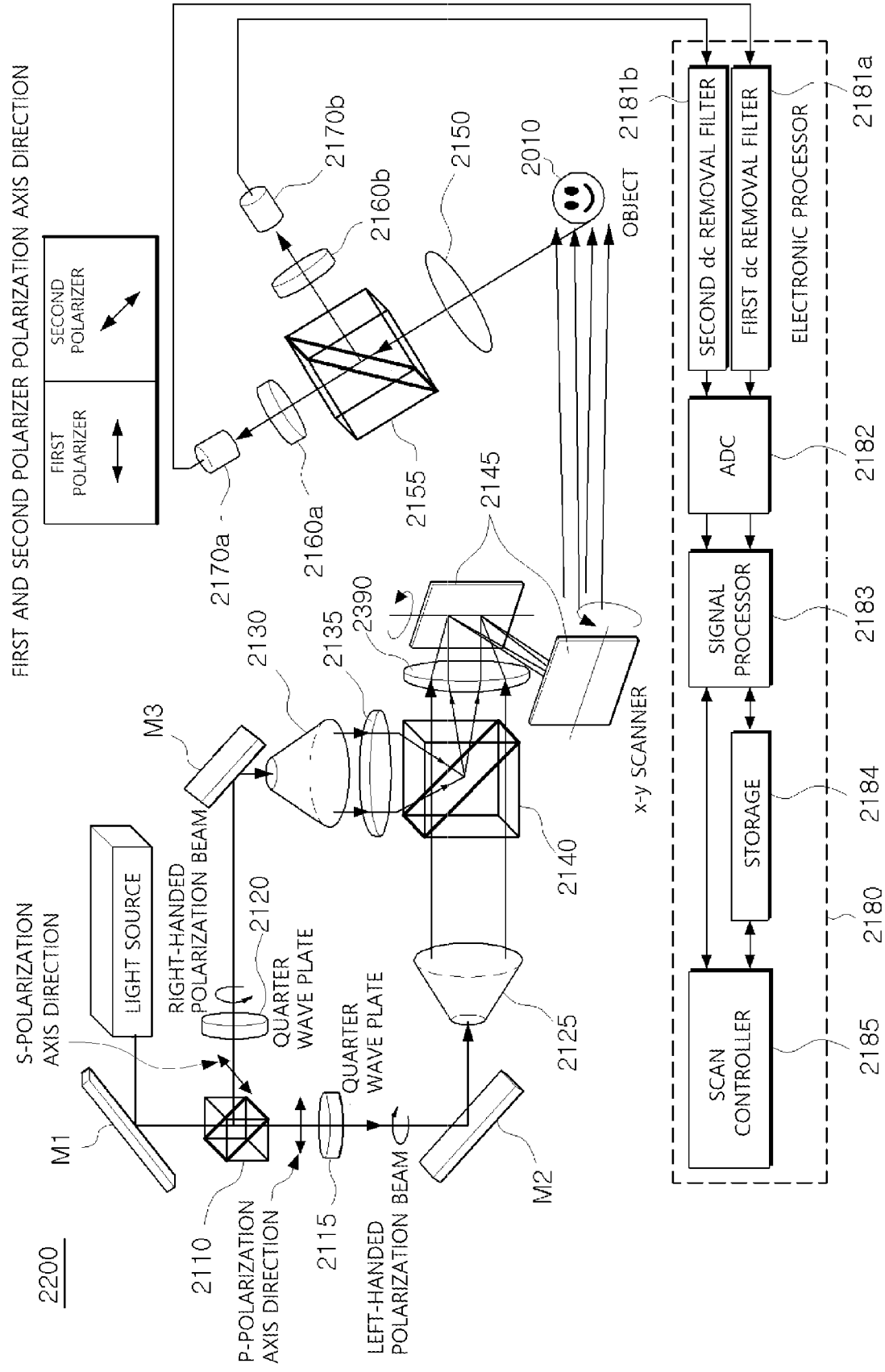
FIG. 10 is a diagram illustrating a second embodiment of the geometric phase scanning holography system according to the present disclosure.

FIG. 10 is a diagram illustrating a second embodiment of the geometric phase scanning holography system according to the present disclosure.

As illustrated in FIG. 10, a geometric phase scanning holography system 2200 according to the second embodiment includes a polarization beam splitter 2110, first and second quarter wave plates 2115 and 2120, first and second collimators 2125 and 2130, a first lens 2135, a first beam splitter 2140, scanning unit 2145, a light integrator 2150, second beam splitter 2155, first and second polarizers 2160a and 2160b, first and second photodetectors 2170a and 2170b, an electronic processor 2180, and a second lens 2390.

In the second embodiment of FIG. 10, the second lens 2390 is additionally inserted between the first beam splitter 2140 and the object in the structure of the first embodiment illustrated in FIG. 8. Accordingly, in FIG. 10, components having the same reference numerals as in the first embodiment of FIG. 8 perform the same operation, and thus, additional description thereon is omitted.

In FIG. 10, the second lens 2390 is located between the first beam splitter 2140 and the scanning unit 2145 and converts a plane wave of a left-handed circular polarized light generated by the first collimator 2125 into a first spherical wave. In this case, an interference beam formed by the first beam splitter 2140 has a form of a nonlinear Fresnel zone plate formed by overlapping a spherical wave of the left-handed circular polarized light and a spherical wave of a right-handed circular polarized light having different focal positions.

Specifically, the second lens 2390 converts the plane wave of the left-handed circular polarized light generated by the first collimator 2125 into the first spherical wave and transmits the first spherical wave to an object, and transfers a focal position of a second spherical wave of the right-handed circular polarized light formed by the second collimator 2130 and the first lens 2135 to an object side.

In this case, when a position of a first focal point of the first spherical wave formed by passing through the second lens 2390 and a position of a second focal point of the second spherical wave whose focal position is changed by passing through the first lens 2135 are between an object and the second lens 2390, a scan beam for scanning the object becomes a nonlinear Fresnel zone plate by overlapping of two emanating spherical waves having different focal positions.

In addition, when the object is scanned by using the nonlinear Fresnel zone plate and the beam reflected from the object is integrated and processed as in the case of the first embodiment, a nonlinear hologram of the object may be obtained and stored in the storage. The nonlinear hologram stored in the storage is represented by Equation 13.

$$I_H(x, y) = \int O(x_0, y_0; z) \otimes \exp\left[j\frac{\pi d}{\lambda(d+z)z}(x_0^2 + y_0^2)\right] dz \quad \text{Equation 13}$$

Here, d is a distance between a focal point of a first spherical wave and a focal point of a second spherical wave. In a case of a nonlinear hologram, distortion caused by reduction and enlargement may be corrected by adjusting d according to Korean Patent Application Publication No. 2013-0081127 (published on Jul. 16, 2013) by the applicant. d may be adjusted by changing a position and a focal length of the second lens 2390 according to a lens imaging law.

In addition, when an object is between a focal position of the first spherical wave and a focal position of the second spherical wave, a hologram of the object encoded to a pattern formed by interference of a reverse curvature of the emanating spherical wave and the converging spherical wave is obtained, and a resolution may be increased by being recovered numerically. This is given by Equation 14.

$$I_H(x, y) = \int O(x_0, y_0; z) \otimes \exp\left[j\frac{\pi d}{\lambda\left(z^2 - \frac{d^2}{4}\right)}(x_0^2 + y_0^2)\right] dz \quad \text{Equation 14}$$

The following describes a third embodiment of the present disclosure. The third embodiment is a method of removing a dc component by adding an additional photodetector without using the first and second dc removal filters 2181a and 2181b and obtaining a hologram robust to noise.

Figure 11:
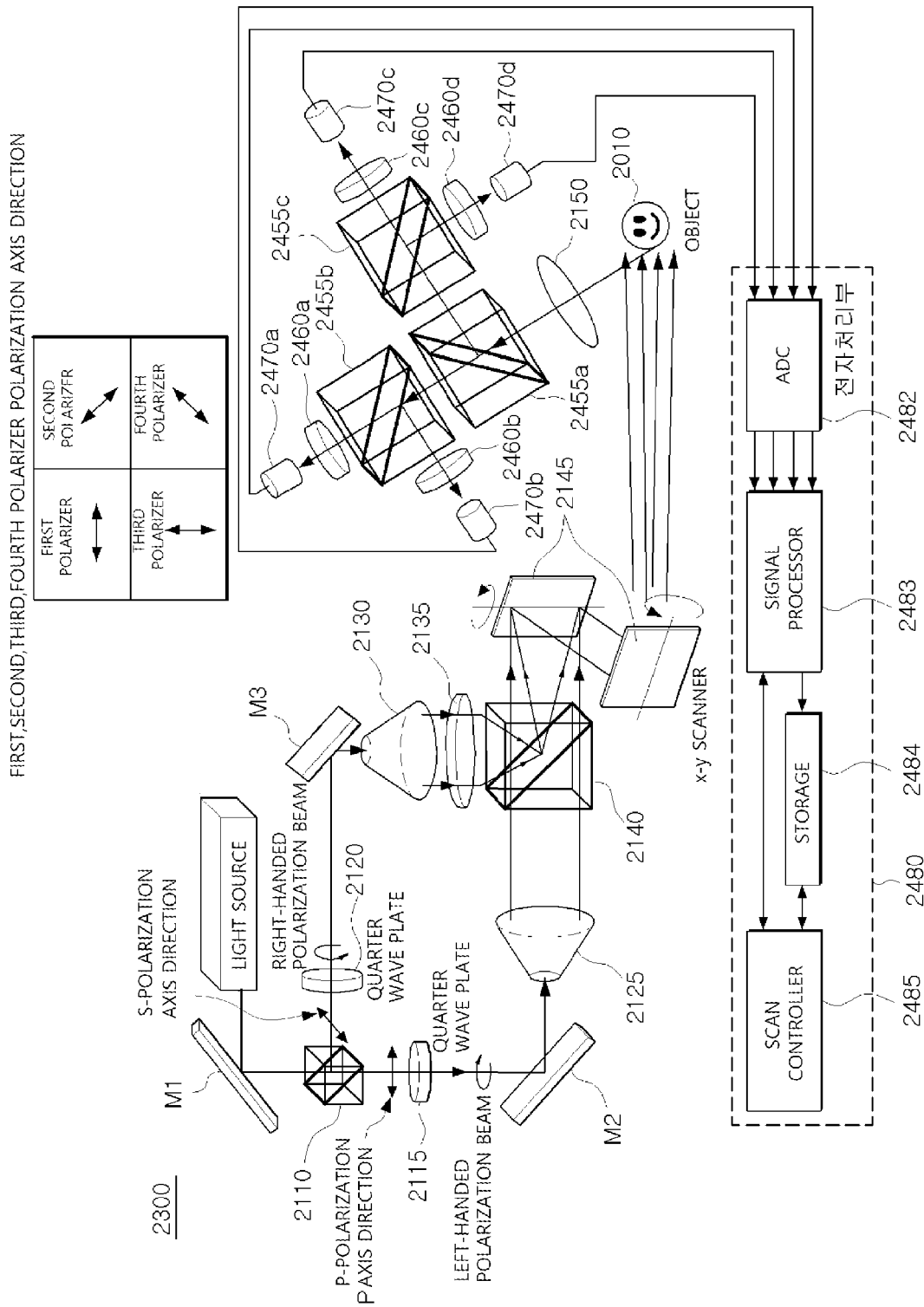
FIG. 11 is a diagram illustrating a third embodiment of the geometric phase scanning holography system according to the present disclosure.

FIG. 11 is a diagram illustrating a third embodiment of the geometric phase scanning holography system according to the present disclosure.

As illustrated in FIG. 11, the geometric phase scanning holography system 2300 according to the third embodiment includes a polarization beam splitter 2110, first and second quarter wave plates 2115 and 2120, first and second collimators 2125 and 2130, a first lens 2135, a first beam splitter 2140, scanning unit 2145, a light integrator 2150, second to fourth beam splitters 2455a, 2455b, and 2455c, first to fourth polarizers 2460a, 2460b, 2460c, and 2460d, first to fourth photodetectors 2470a, 2470b, 2470c, and 2470d, and an electronic processor 2480.

The third embodiment of FIG. 11 has a configuration obtained by changing the light integration portion from the structure of the first embodiment of FIG. 8. Accordingly, in FIG. 11, components having the same reference numerals as in the first embodiment of FIG. 8 perform the same operations, and thus, additional description thereon is omitted.

Hereinafter, components subsequent to the light integrator 2150 will be mainly described.

The second beam splitter 2455a receives the integrated beam from the light integrator 2150 and splits the integrated beam into first and second output beams. The first output beam passing through the second beam splitter 2455a is transferred to the third beam splitter 2455b, and the second output beam reflected therefrom is transferred to the fourth beam splitter 2455c.

The third beam splitter 2455b divides the first output beam into $1a^{th}$ and $1b^{th}$ output beams again. The $1a^{th}$ output beam passing through the third beam splitter 2455b is transferred to the first polarizer 2460a, and the $1b^{th}$ output beam reflected therefrom is transferred to the second polarizer 2460b.

The fourth beam splitter 2455c splits the second output beam into $2a^{th}$ and $2b^{th}$ output beams again. The $2a^{th}$ output beam passing through the fourth beam splitter 2455c is transferred to the third polarizer 2460c, and the $2b^{th}$ output beam reflected therefrom is transferred to the fourth polarizer 2460d.

In this case, the second, third, and fourth polarizers 2460b, 2460c, and 2460d have polarization directions rotated by 45 degrees, 90 degrees, and 135 degrees clockwise, respectively, based on the polarization direction of the first polarizer 2460a.

The first to fourth photodetectors 2470a, 2470b, 2470c, and 2470d are installed to correspond to the first to fourth polarizers 2460a, 2460b, 2460c, and 2460d, respectively, and detect output beams of the first to fourth polarizers 2460a, 2460b, 2460c, 2460d.

Here, the first to fourth photodetectors 2470a, 2470b, 2470c, and 2470d generate the first to fourth current signals, respectively, in correspondence with intensities of the output beams passing through the first to fourth polarizers 2460a, 2460b, 2460c, and 2460d, as in the first embodiment.

The detected first to fourth current signals are referred to as $n^{th}$ current signal ($I_{p_n}(x,y;z)$) and may be defined by following Equation 15.

$$I_{p_n}(x, y; z) = \int O(x_0, y_0; z) \otimes \cos\left[\frac{\pi}{\lambda z}(x_0^2 + y_0^2) + p_n\right] dz, \quad \text{Equation 15}$$

$$p_n = \left\{0, \frac{\pi}{2}, \pi, \frac{3\pi}{2}\right\}$$

Here, n={1, 2, 3, 4}, which are indexes corresponding to the first, second, third, and fourth photodetectors, respectively.

In addition, $p_n$ is a shifted phase of a hologram signal generated by the $n^{th}$ photodetector designated as n, $O(x_0, y_0; z)$ is a three-dimensional distribution for reflectance of an object and is a three-dimensional image of the object, $\otimes$ is a convolution operation, $\lambda$ is a wavelength of a used beam, (x,y) is a scan position of a scan beam designated by the scanning unit 2145, and z is a distance from a focal point of a spherical wave to the object.

The first to fourth current signals according to Equation 15 are transferred to the AD converter 2482 in the electronic processor 2480.

The electronic processor 2480 processes the first to fourth current signals detected by the first to fourth photodetectors to generate a complex hologram of the object, and includes the AD converter 2482, the signal processor 2483, the storage 2484, and the scan controller 2485.

The AD converter 2482 converts the first to fourth current signals into digital signals. The AD converter 2482 includes four input channels, and receives a 0 phase, a $\pi/2$ phase, a $\pi$ phase, and a $3\pi/2$ phase of Equation 15 through each channel and converts the phases into digital signals. The converted digital current signals are provided to the signal processor 2483 together with scan positions of the scanning unit 2145.

The signal processor 2483 generates a complex hologram of the object from the converted digital signals, and the storage 2484 stores the generated complex hologram.

In this case, the complex hologram may be defined by following Equation 16.

$$I_H(x, y) = \{I_{p_4}(x, y) - jI_{p_2}(x, y)\} - j\{I_{p_3}(x, y) - jI_{p_1}(x, y)\} = \quad \text{Equation 16}$$

$$\int O(x_0, y_0; z) \otimes \exp\left[j\frac{\pi}{\lambda z}(x_0^2 + y_0^2)\right]dz$$

Whenever hologram processing for a certain position of the object is completed, the scan controller 2485 generates a control signal for changing positions of the scanning unit 2145 and transfers the generated control signal to the scanning unit 2145. Of course, to this end, the signal processor 2483 forms two-dimensional arrays for each scan position by adding signals according to each phase of Equation 15 by using a complex addition method as represented by Equation 16, and the storage 2484 stores the two-dimensional arrays.

In addition, the signal processor 2483 forms two-dimensional arrays according to each scan position for the signal according to each phase of Equation 15 and transfers the two-dimensional arrays to the storage 2484, and then, reads the two-dimensional arrays from the storage 2484 to add the two-dimensional arrays corresponding to signals according to each phase of Equation 15 by using the complex addition method of Equation 16, and then stores the two-dimensional arrays in the storage 2484 again, when the scan ends.

The following describes a fourth embodiment of the present disclosure. The fourth embodiment of the present disclosure is a case in which the fourth beam splitter 2455c, the fourth polarizer 2460d, and the fourth photodetector 2470d in the dotted line box are removed from FIG. 11 which is a diagram according to the third embodiment.

In this case, operations of the second and third beam splitters 2455a and 2455b are the same as in the third embodiment. A difference from the third embodiment is that the second output beam reflected from the second beam splitter 2455a is transferred to the third polarizer 2460c to be polarized, and the beam polarized through the third polarizer 2460c is detected by the third detector 2470c.

In the fourth embodiment, three current signals outputted from the first, second, and third photodetectors 2470a, 2470b, and 2470c are converted into digital signals by an AD converter having three channels and transferred to the signal processor, and the signal processor may process the digital signals by using the method of Equation 17 to obtain a complex hologram.

$$I_H(x, y) = I_{p_1}(x, y)\{\exp(jp_3) - \exp(jp_2)\} + I_{p_2}(x, y) \quad \text{Equation 17}$$

$$\{\exp(jp_1) - \exp(jp_2)\} + I_{p_3}(x, y)\{\exp(jp_2) - \exp(jp_1)\} =$$

$$\int O(x_0, y_0; z) \otimes \exp\left[j\frac{\pi}{\lambda z}(x_0^2 + y_0^2)\right]dz$$

According to the geometric phase scanning holography system of the present disclosure described above, a complex hologram of a real object without bi-image noise and background noise may be obtained by using a geometric structure according to polarization without using a complicated modulator for modulating an optical signal, and thus, the geometric phase scanning holography system has a reduced complexity of a structure and may be miniaturized and lightened and may also be applied to mobile devices sensitive to energy consumption.

Next, a geometric phase in-line scanning holography system will be described with reference to FIGS. 12 to 20.

The geometric phase in-line scanning holography system has high stability and low complexity by forming a scan pattern in a single optical path by using a polarization-sensitive lens and may obtain a complex hologram of a real object from which bi-image noise and background noise are removed without a complicated modulator by using a geometric phase detection method.

Figure 12:
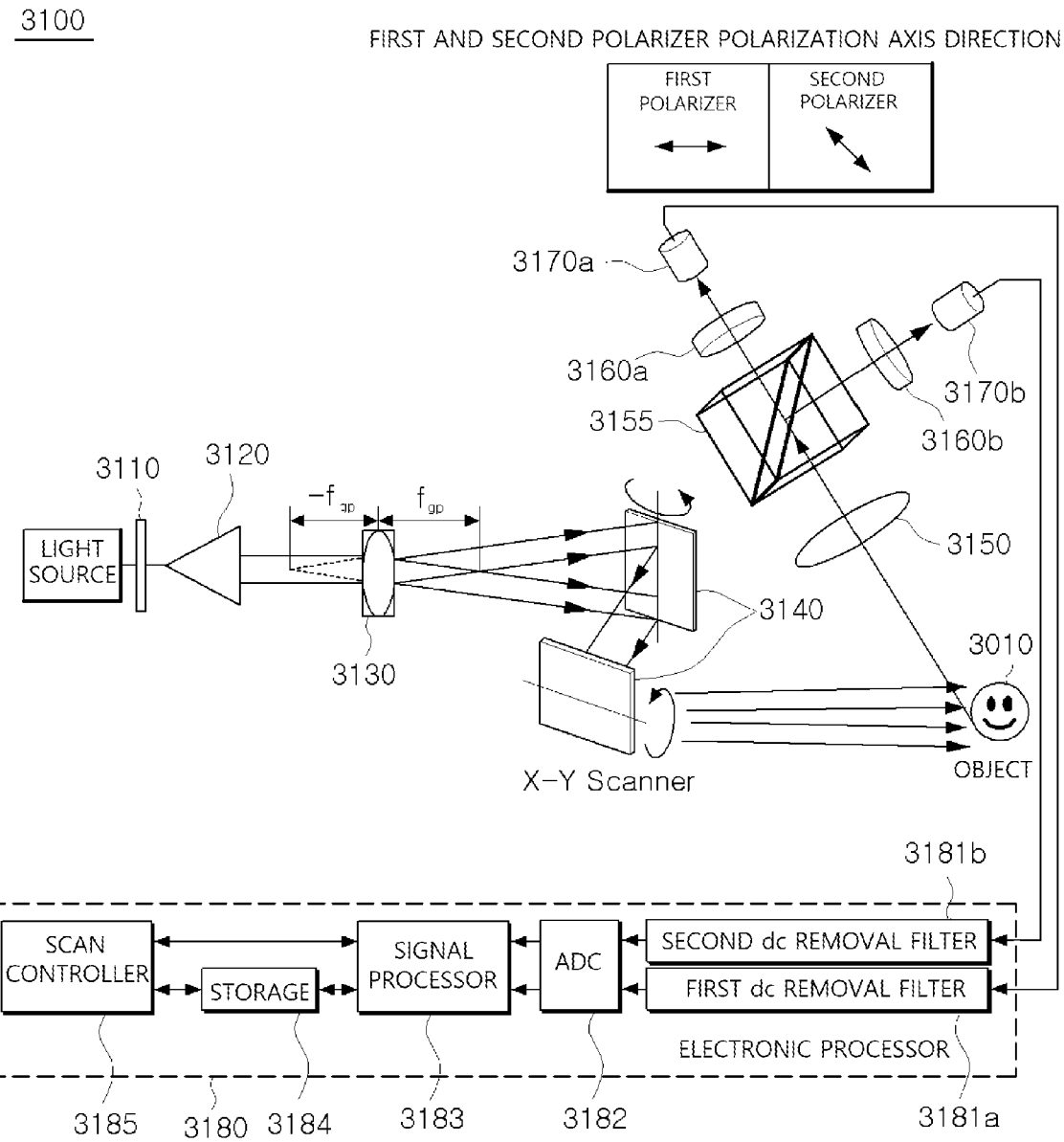
FIG. 12 is a diagram illustrating a first embodiment of a geometric phase in-line scanning holography system according to the present disclosure.

FIG. 12 is a diagram illustrating a first embodiment of the geometric phase in-line scanning holography system according to the present disclosure.

As illustrated in FIG. 12, the geometric phase in-line scanning holography system 3100 according to the first embodiment includes a polarizer 3110, a collimator 3120, a polarization-sensitive lens 3130, scanning unit 3140, a light integrator 3150, a first beam splitter 3155, first and second polarizers 3160a and 3160b, first and second photodetectors 3170a and 3170b, and an electronic processor 3180.

First, a light source generates electromagnetic waves. In the embodiment of the present disclosure, various devices such as a laser generator that outputs coherent light, a light emitting diode (LED) lamp with low coherence, and a halogen lamp having a short coherence length may be used for the light source.

The polarizer 3110 (linear polarizer) converts an inputted beam into a linearly polarized beam and provides the linearly polarized beam to the collimator 3120. In FIG. 12, the light source and the polarizer 3110 may be omitted, and in this case, an externally generated linearly polarized beam may be directly inputted to the collimator 3120. In addition, when the light source is omitted in FIG. 12, a light source provided from the outside may be directly inputted to the polarizer 3110.

The collimator 3120 expands the beam outputted from the polarizer 3110 and transfers the beam to the polarization-sensitive lens 3130 and may be configured by various devices capable of expanding a beam.

The polarization-sensitive lens 3130 receives the linearly polarized beam expanded through the collimator 3120 and simultaneously generate a first spherical wave of a right-handed circular polarized light having a negative focal length and a second spherical wave of a left-handed circular polarized light having a positive focal length.

Here, the polarization-sensitive lens 3130 may be configured with a geometric phase lens. The polarization-sensitive lens 3130 has a thin flat plate structure with a Pancharatnam-phase effect based on a liquid crystal, and acts as a lens that changes to a wavefront of an input beam into a wavefront having positive and negative focal lengths according to polarization of inputted light. The geometric phase lens may be made by using an analog hologram recording device based on a Mach-Zehnder interferometer as known, and for example, a ready-made product provided by ImagineOptix company may be used.

Figure 13:
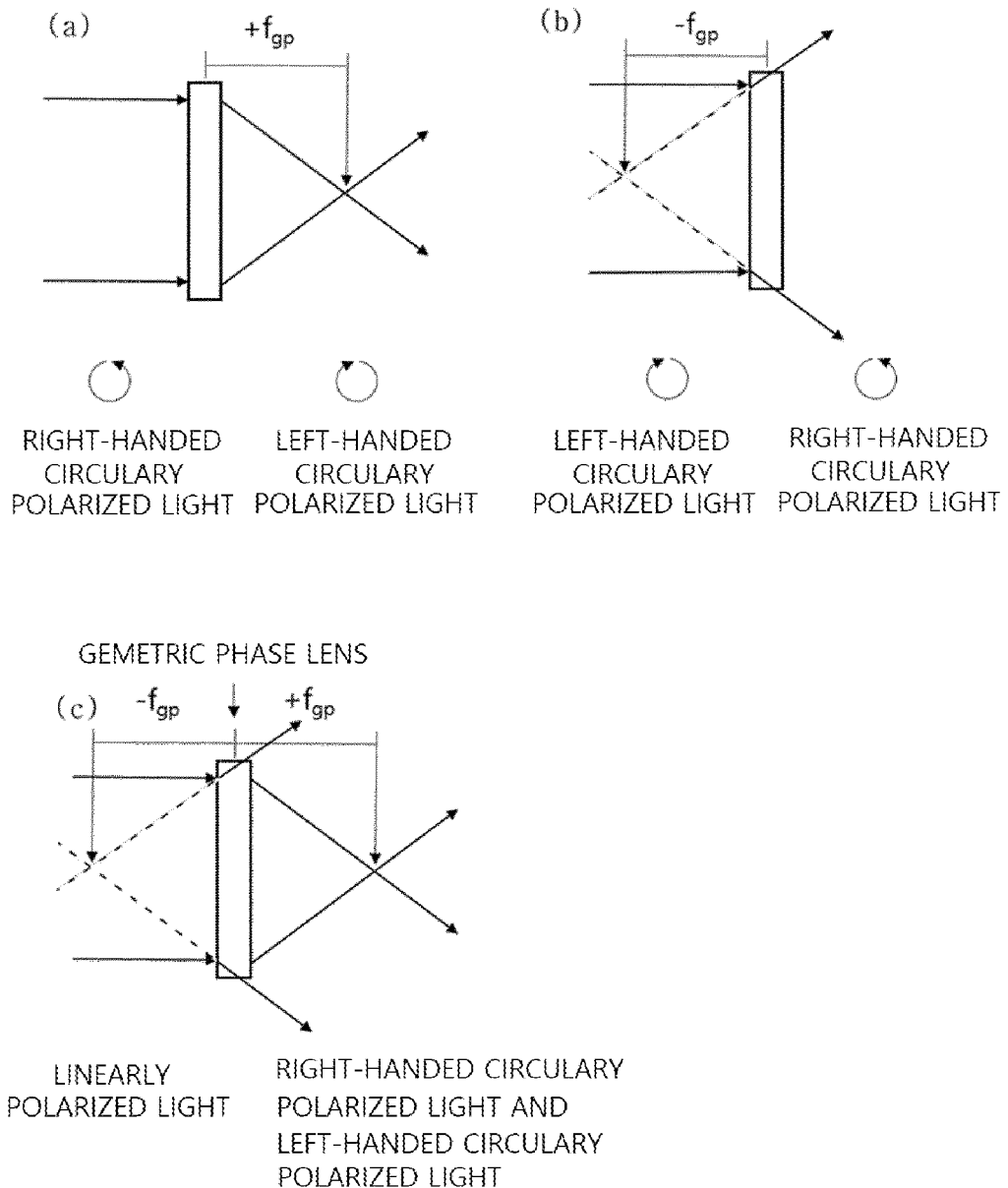
FIG. 13 illustrates diagrams for showing a principle of a polarization-sensitive lens according to an embodiment of the present disclosure.

FIG. 13 illustrates diagrams for showing a principle of the polarization-sensitive lens according to an embodiment of the present disclosure.

As illustrated in (a) of FIG. 13, when a right-handed circular polarized beam is incident, the geometric phase lens (polarization-sensitive lens) 3130 acts as a convex lens in response to a corresponding polarization direction to generate a spherical wave of a left-handed circular polarized light having a positive focal length $+f_{gp}$, and when a left-handed circular polarized beam is incident as illustrated in (b) of FIG. 13, the geometric phase lens responds to a corresponding polarization direction to act as a concave lens to generate a spherical wave of right-handed circular polarized light having a negative focal length $-f_{gp}$.

However, in the embodiment of the present disclosure, the wavefront of the linearly polarized beam is inputted to the geometric phase lens as illustrated in (c) of FIG. 13, and in this case, the geometric phase lens divides energy intensity of the inputted light half and half to simultaneously generate wavefronts of a spherical wave (hereinafter, referred to as a first spherical wave) of a right-handed circular polarized light having a negative focal length $-f_{gp}$ and a spherical wave (hereinafter, the second spherical wave) of a left-handed circular polarized light having a positive focal length $+f_{gp}$.

In this way, the polarization-sensitive lens 3130 changes some of the incident linearly polarized beam into a right-handed circular polarized beam to form the first spherical wave that places a focal point on a side opposite to a travel direction of the incident beam, and at the same time, changes the rest into a left-handed circular polarized beam to form the second spherical wave that places the focal point in the travel direction of the incident beam.

As described above, according to the embodiment of the present disclosure, a scan pattern is formed in a single optical path by using a polarization-sensitive lens, and thus, it is possible to provide an optical scanning holography with higher efficiency and higher quality than a technique of the related art which separates a light source into two paths and then recombines to form an interference pattern, and also there is an advantage of being robust and stable against external environment by using an optical system structure with high stability and low complexity.

The first and second spherical waves extracted in line from the polarization-sensitive lens 3130 are transferred to the scanning unit 3140. Here, the first spherical wave and the second spherical wave form an interference beam while overlapping each other on the in-line structure.

The scanning unit 3140 scans an object by using the interference beam generated between the first and second spherical waves.

In this case, the interference beam may be defined by following Equation 18 in the form of a geometric phase Fresnel zone plate.

$$I_{GP-FZP}(x_\theta, y_0; z) = \cos\left[\frac{2\pi f_{gp}}{\lambda(2f_{gp}+z)z}(x_0^2 + y_0^2) + 2\theta\right] \quad \text{Equation 18}$$

Here, $\lambda$ is a wavelength of a used beam, $f_{gp}$ is a focal length of the polarization-sensitive lens, $(x_0^2+y_0^2)$ is a Catharsian coordinate system having a plane orthogonal to an optical axis of a linearly polarized beam as $(x_0, y_0)$, z is a distance from a focal point of the second spherical wave to an object, and $\theta$ is an angle linearly polarized clockwise with respect to a polarization axis of the polarizer 3110.

That is, among the first and second spherical waves generated through the polarization-sensitive lens 3140 of FIG. 12, an interference pattern of a portion linearly polarized in an axial direction having an angle of $\theta$ clockwise with respect to a polarization axis of the polarizer 3110 becomes a nonlinear Fresnel zone plate with a phase shifted by $2\theta$. At this time, since a phase of the interference pattern is shifted by a geometric rotation angle of the polarization axis, this form is called a geometrical phase Fresnel zone plate.

The scanning unit 3140 scans an object by using an interference beam received from the polarization-sensitive lens 3130. The scanning unit 3140 scans an imaging object (hereinafter, referred to as an object) by using the interference beam as a response command beam.

An intensity pattern of the response command beam for scanning the object may be defined by Equation 19.

$$I(x_0, y_0; z) = \quad \text{Equation 19}$$
$$I_{GP-FZP}(x_0, y_\theta; z) + \text{dc} = \cos\left[\frac{2\pi f_{gp}}{\lambda(2f_{gp}+z)z}(x_0^2 + y_0^2) + 2\theta\right] + \text{dc}$$

Here, dc is the sum of a spherical wave intensity pattern and a spherical wave intensity pattern, and in an ideal case, there is no change according to a space, and even in an actual case, dc is a direct current bias component with a very small change according to the space.

In the present embodiment, the scanning unit 3140 uses a mirror scanner. The mirror scanner is configured with an X-Y scanner including a horizontal scan mirror that scans the object 3010 in the X direction and a vertical scan mirror that scans the object 3010 in the Y direction. Of course, in the present disclosure, the scanning unit 3140 is not limited to the mirror scanner, and similar unit or other known scanning unit may be used therefor.

In the embodiment of the present disclosure, a beam in which a right-handed circular polarized spherical wave and a left-handed circular polarized spherical wave overlap each other is transferred to the mirror-shaped scanning unit 3140, and the scanning unit 3140 moves the geometrical phase Fresnel zone plate across the object to allow the object to be scanned.

The scanning unit 3140 operates by receiving a scan control signal from the scan controller 3185 provided in the electronic processor 3180, and the scan controller 3185 generates the scan control signal for controlling the scan positions of the scanning unit 3140. Here, the scan control signal may include a horizontal scan signal and a vertical scan signal for controlling the horizontal and vertical scan mirrors in a horizontal direction and a vertical direction, respectively.

Of course, instead of using the mirror scanner, the object may be placed on an objective plate, and the objective plate may be horizontally moved to scan the object. In addition, in the present disclosure, an object may be scanned by using various methods such as a method of using an electrooptic deflector.

The beam reflected from the object 3010 is spatially integrated by the light integrator 3150 at a scan position of a scan beam designated by the scanning unit 3140.

Here, the light integrator 3150 may be configured by a lens and may be configured by various known light integrators such as an imaging or non-imaging light integrator including a concave reflector.

A beam integrated by the light integrator 3150 is transferred to the first beam splitter 3155. The first beam splitter 3155 receives the integrated beam from the light integrator 3150 and separates the integrated beam into first and second output beams. The first beam splitter 3155 transmits therethrough some of the beam integrated by the light integrator 3150 to transfer the beam to the first polarizer 3160a and reflects some of the beam to transfer the reflected beam to the second polarizer 3160*b*. That is, the transmitted first output beam is transferred to the first polarizer 3160*a*, and the reflected second output beam is transferred to the second polarizer 3160*b*.

The first and second polarizers 3160*a* and 3160*b* polarize the received first and second output beams, respectively. Here, the second polarizer 3160*b* is located in a polarization direction rotated by 45 degrees clockwise based on the polarization direction of the first polarizer 3160*a*.

The first polarizer 3160*a* transmits therethrough a beam polarized in the polarization direction of the first polarizer 3160*a* among the first output beam received from the second beam splitter 3155 and transfers the transmitted beam to the first photodetector 3170*a*. Likewise, the second polarizer 3160*b* transmits therethrough a beam polarized in the polarization direction of the second polarizer 3160*b* among the received second output beam and transfers the transmitted beam to the second photodetector 3170*b*.

The first and second photodetectors 3170*a* and 3170*b* are installed to correspond to the first and second polarizers 3160*a* and 3160*b* and detect the output beams passing through the first and second polarizers 3160*a* and 3160*b*.

The first and second photodetectors 3170*a* and 3170*b* may be configured by photodiodes, but the present disclosure is not limited thereto, and various photodetectors such as a photo-multiplier tube may be applied thereto. In addition, it is also possible to directly detect light transferred onto a detection surface of the light detector without a light integrator.

The first and second photodetectors 3170*a* and 3170*b* detect a polarized beam in a direction of the first polarizer 3160*a* and a polarized beam in a direction of the second polarizer 3160*b* among the beams spatially integrated by the light integrator 3150 to convert the polarized beams into current signals and generate currents according to intensity of the polarized beams.

That is, the first and second photodetectors 3170*a* and 3170*b* generate first and second current signals in response to the intensity of the first and second output beams passing through the first and second polarizers 3160*a* and 3160*b*.

With respect to a scan position of a scan beam designated by the scanning unit 3140, the first current signal generated by the first photodetector 3170*a* corresponds to a pattern in which a geometric phase Fresnel zone plate in a direction of the first polarizer and the three-dimensional image distribution of the object are encoded, and the second current signal generated by the second photodetector 3170*b* corresponds to a pattern in which a geometric phase Fresnel zone plate in a direction of the second polarizer and a three-dimensional image distribution of the object are encoded.

The polarization direction of the second polarizer 3160*b* is rotated by 45 degrees clockwise based on the polarization direction of the first polarizer 3160*a*. Accordingly, the first and second current signals $$I_0^{dc}(x, y; z) \text{ and } I_{\pi/2}^{dc}(x, y; z)$$

generated by the first and second photodetectors, respectively, may be defined by following Equation 20 and Equation 21 based on the polarization direction of the first polarizer 3160*a*.

$$I_0^{dc}(x, y) = \quad \text{Equation 20}$$

$$\int O(x_0, y_0; z) \otimes \left\{ \cos\left[ \frac{2\pi f_{gp}}{\lambda(2f_{gp}+z)z}(x_0^2 + y_0^2) \right] + dc \right\} dz$$

$$I_{\pi/2}^{dc}(x, y) = \int O(x_0, y_0; z) \otimes \left\{ \cos\left[ \frac{2\pi f_{gp}}{\lambda(2f_{gp}+z)z} + \frac{\pi}{2} \right] + dc \right\} dz \quad \text{Equation 21}$$

Here, $O(x_0,y_0;z)$ is a three-dimensional image of an object as a three-dimensional distribution for reflectance of the object, $\otimes$ is a convolution operation, $\lambda$ is a wavelength of a used beam, $(x,y)$ is a scan position of a scan beam designated by the scanning unit, $f_{gp}$ is a focal length of the polarization-sensitive lens, $z$ is a distance (a depth position of the object) from a focal point of a second spherical wave to the object, and dc is a DC bias component.

The first and second current signals according to Equation 20 and Equation 21 are transferred to the first and second dc removal filters 3181*a* and 3181*b* of the electronic processor 3180, respectively.

The electronic processor 3180 processes the first and second current signals detected by the first and second photodetectors to generate a complex hologram of the object, and includes the first and second dc removal filters 3181*a* and 3181*b*, the AD converter 3182, the signal processor 3183, the storage 3184, and the scan controller 3185.

The first and second dc removal filters 3181*a* and 3181*b* remove DC bias components, that is, dc components from the first and second current signals, respectively, and input the first and second current signals to the AD converter 3182.

The first and second dc removal filters 3181*a* and 3181*b* remove a portion in which dc and a reflectance distribution of the object are convolved in Equation 20 and Equation 21 to generate signals represented by following Equation 22 and Equation 231 as outputs and transfer the outputs to the converter 3182.

$$I_0(x, y) = \int O(x_0, y_0; z) \otimes \cos\left[ \frac{2\pi f_{gp}}{\lambda(2f_{gp}+z)z}(x_0^2 + y_0^2) \right] dz \quad \text{Equation 22}$$

$$I_{\pi/2}(x, y) = \int O(x_0, y_0; z) \otimes \cos\left[ \frac{2\pi f_{gp}}{\lambda(2f_{gp}+z)z}(x_0^2 + y_0^2) + \frac{\pi}{2} \right] dz \quad \text{Equation 23}$$

The AD converter 3182 converts the first and second current signals whose dc components are filtered through respective filters into digital signals. The AD converter 3182 includes two input channels to receive in-phase signals of Equation 22 and a $\pi/2$ phase signal of Equation 23 through the respective channels and converts the signals into digital signals.

The signal processor 3183 generates a complex hologram of an object from the converted digital signals, and the storage 3184 stores the generated complex hologram.

In this case, the complex hologram may be defined by following Equation 24.

$$I_H(x, y) = I_0(x, y) - jI_{\pi/2}(x, y) = \quad \text{Equation 24}$$

$$\int O(x_0, y_0; z) \otimes \exp\left[ j\frac{2\pi f_{gp}}{\lambda(2f_{gp}+z)z}(x_0^2 + y_0^2) \right] dz$$

Here, $I_0(x,y)$ is a value obtained by removing a dc component from $I_0^{dc}(x, y)$ and $I_{\pi/2}^{dc}(x, y)$ and is a value obtained by removing a dc component from $I_{\pi/2}^{dc}(x, y)$.

The scan controller 3185 generates a control signal for changing positions of the scanning unit 3140 whenever hologram processing for a certain position of an object is completed, and transfers the generated control signal to the scanning unit 3140. Of course, to this end, the signal processor 3183 forms two-dimensional arrays for each scan position by adding Equation 22 and Equation 23 to each other by using a complex addition method as in Equation 24, and the storage 3184 stores the two-dimensional arrays.

Here, instead of omitting the first and second dc removal filters 3181a and 3181b, the AD converter 3182 may receive outputs of the first and second photodetectors 3170a and 3170b and may convert the outputs to digital signals and may remove and filter dc components by using a digital signal processing method.

In addition, the signal processor 3183 forms two-dimensional arrays according to each scan position with respect to Equation 22 and Equation 23 and transfers the two-dimensional arrays to the storage 3184 and then reads the arrays from the storage 3184 when the scan ends to add the two-dimensional arrays corresponding to Equation 22 and Equation 23 by using the complex addition method of Equation 24 and then stores the arrays in the storage 3184 again.

Here, Equation 24 is the same as the complex hologram obtained by using the optical scanning hologram of the related art, which means that a hologram having the same is as in the related art may be generated through an in-line structure without a complicated interferometric structure without using a complicated optical modulator. The configuration of FIG. 12 may be applied to FIGS. 14, 17, and 18 below.

Figure 14:
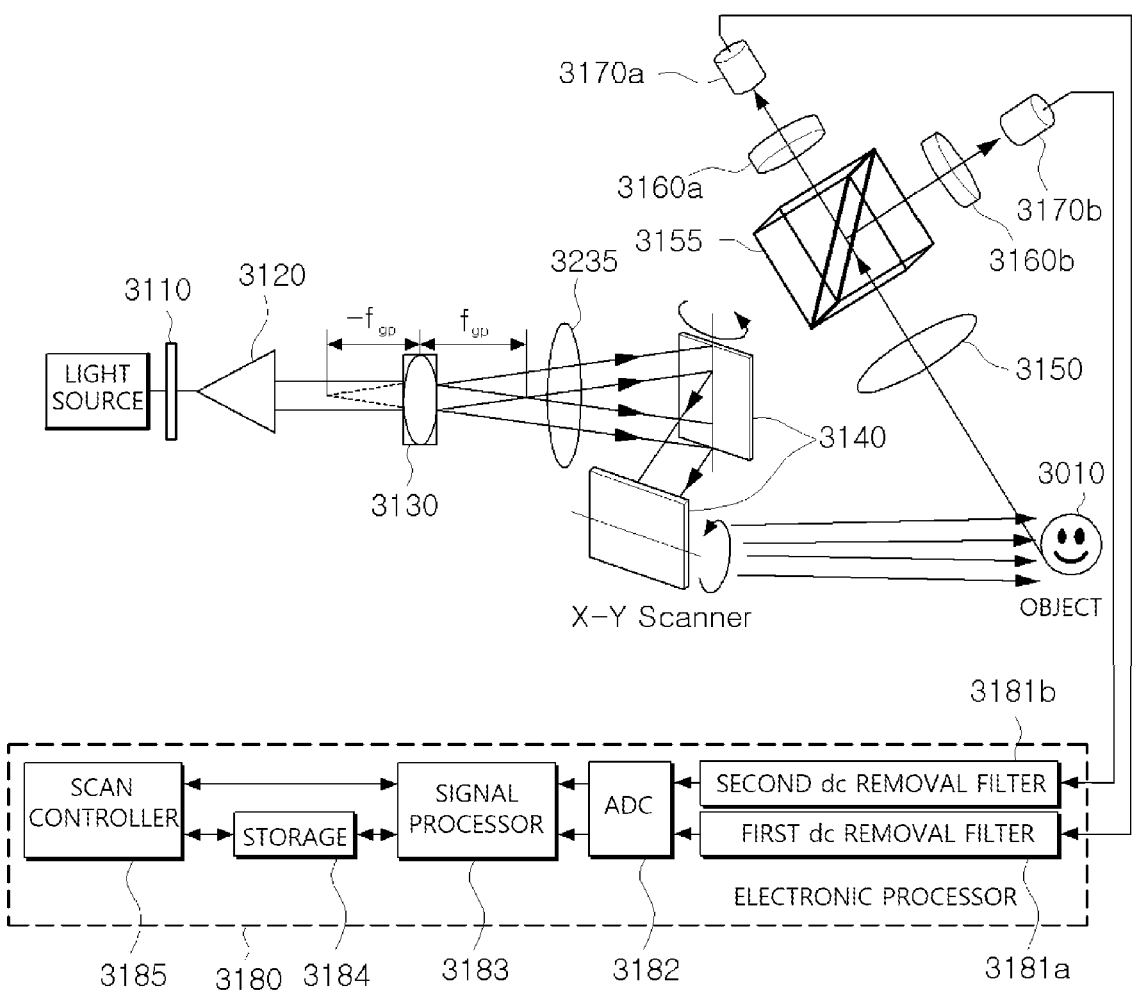
FIG. 14 is a diagram illustrating a second embodiment of the geometric phase in-line scanning holography system according to the present disclosure.

FIG. 14 is a diagram illustrating a second embodiment of the geometric phase in-line scanning holography system according to the present disclosure.

As illustrated in FIG. 14, the geometric phase in-line scanning holography system 3200 according to the second embodiment includes a polarizer 3110, a collimator 3120, a polarization-sensitive lens 3130, a first lens 3235, scanning unit 3140, a light integrator 3150, a first beam splitter 3155, first and second polarizers 3160a and 3160b, first and second photodetectors 3170a and 3170b, and an electronic processor 3180.

FIG. 14 illustrates that the first lens 3235 is additionally inserted into the structure according to the first embodiment of FIG. 12, and additional description on the components having the same reference numerals is omitted.

In FIG. 14, the first lens 3235 is provided between the polarization-sensitive lens 3130 and the scanning unit 3140 to adjust a distance between respective focal points of the first and second spherical waves and acts as an imaging lens for imaging a pattern of a surface of the polarization-sensitive lens on a surface of an object region.

That is, when the surface of the geometric phase lens is imaged in the object region by being enlarged or reduced by the first lens 3235, a pattern on the surface of the geometric phase lens may be imaged and projected on the object.

When a focal position of the first spherical wave is referred to as f1 and a focal position of the second spherical wave is referred to as f2, a distance between the positions f1 and f2 in FIG. 12 is $2f_{gp}$, but in FIG. 14, the distance between the positions f1 and f2 is changed to $2M^2_{img}f_{gp}$ according to a reduction or enlargement rate of the first lens 3235.

In addition, in FIG. 14, an interference beam may be defined by following Equation 25 as a is of a geometric phase non-linear Fresnel zone plate.

$$I(x_0, y_0; z_{img}) = \cos\left[\frac{2\pi M^2_{img} f_p}{\lambda(2M^2_{img} f_{gp} + z_{img}) z_{img}}\left(M^2_{img} x_0^2 + M^2_{img} y_0^2\right) + 2\theta\right] + dc$$

Equation 25

Here, $M_{img}$ is a reduction or enlargement rate of an image generated by the first lens 3235 when imaging a pattern of a surface of the polarization-sensitive lens (geometric phase lens) on a surface of the object region, $z_{img}$ is a distance from a focal point of the second spherical wave to the object, $2M^2_{img}f_{gp}$ is a distance between respective focal points of the adjusted first and second spherical waves.

In this way, by placing the first lens 3235 between the polarization-sensitive lens 3130 and the object 3010, new first and second spherical waves in which a distance between two focal points of the two spherical waves is changed may be placed on a surface of the object by using an enlargement or reduction method.

Here, the embodiments of the present disclosure described above exemplify that an object is placed in a region where the two spherical waves perform emanation, but the object may also be placed between (a point between the positions f1 and f2) the focal points of the two spherical waves by using a method of increasing a resolution in a microscope application of a heterodyne scanning-based hologram.

To this end, a hologram of the object encoded by an interference pattern of a reverse curvature of an emanating spherical wave and a converging spherical wave may be obtained by placing an imaging lens between the polarization-sensitive lens (geometric phase lens) and the object by using a method of placing the focal position f1 of the first spherical wave in the front of the object and placing the focal position f2 of the second spherical wave in the rear of the object, and thus, the hologram may be recovered numerically to increase a resolution.

For example, a hologram encoded to an interference pattern of the converging first spherical wave and the emanating second spherical wave may be obtained when imaging the surface of the geometric phase lens on a surface of the object, by placing an imaging lens between the geometric phase lens and the object, and in this case, the interference pattern may be defined by following Equation 26.

$$I(x_0, y_0; z_{img}) = \cos\left[\frac{2\pi M^2_{img} f_{gp}}{\lambda(z^2_{img} - M^4_{img} f^2_{gp})}\left(M^2_{img} x_0^2 + M^2_{img} y_0^2\right) + 2\theta\right] + dc$$

Equation 26

Here, $M_{img}$ is a reduction or enlargement rate of an image generated by an imaging lens when imaging a pattern of a surface of the polarization-sensitive lens (geometric phase lens) on a surface of an object, and $z_{img}$ is a distance from a focal point of the second spherical wave to the object.

In addition, according to the embodiment of the present disclosure, an interference pattern between a plane wave and a spherical wave may be formed by placing a second lens (not illustrated) between the polarization-sensitive lens 3130 and the scanning unit 3140.

In general, an optical scanning holography scans an object with a linear Fresnel zone plate in which a spherical wave and a plane wave interfere with each other, and thereby, a hologram of the object is obtained. Interference patterns of the plane wave and the spherical wave may be formed by placing a lens between the geometric phase lens and the object. Accordingly, a hologram encoded by the linear Fresnel zone plate, which is an interference pattern formed by interference between the spherical wave and the plane wave, may be obtained.

This will be described in detail as follows. In this case, for the sake of convenient description, it is assumed that the second lens is arranged instead of the first lens in a place of a reference numeral 3235 of FIG. 14.

The second lens (not illustrated) is arranged between the polarization-sensitive lens 3130 and the scanning unit 3140 and is arranged to form a focal point at the same focal position f2 as the second spherical wave. As described above, when the focal position of the second lens (not illustrated) and the focal position of the second spherical wave are the same as each other, the second spherical wave is converted into a plane wave, and a curvature of the spherical wave is added to the first spherical wave by the second lens.

In this case, an interference beam may be defined by following Equation 27 as a is of a linear Fresnel zone plate formed by interference between the first spherical wave and the plane wave.

$$I(x_0, y_0; z) = \cos\left[\frac{\pi}{\lambda z}(x_0^2 + y_0^2) + 2\theta\right] + dc \quad \text{Equation 27}$$

Here, z is a distance from a focal point of the first spherical wave to which a curvature is added by the second lens to the object.

In this way, when the second lens is inserted such that a focal position of the second lens is the same as a focal position of the second spherical wave, a hologram encoded by the linear Fresnel zone plate, which is an interference pattern between a spherical wave and a plane wave, may be obtained.

The following describes a third embodiment of the present disclosure. The third embodiment provides a method by which a dc component is removed without using the first and second dc removal filters 3181*a* and 3181*b* by adding an additional photodetector to the first embodiment and by which a hologram robust to noise is obtained.

Figure 15:
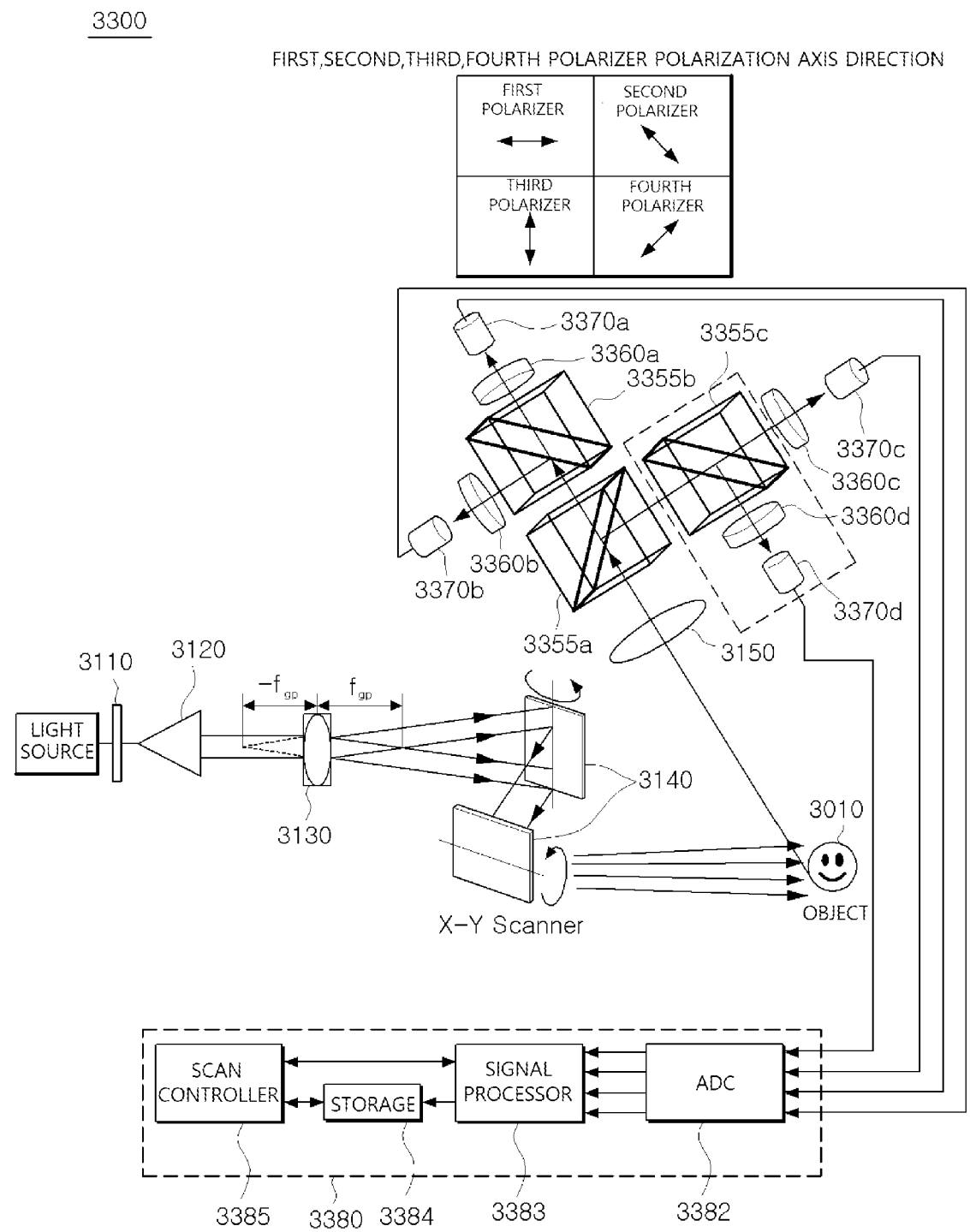
FIG. 15 is a diagram illustrating a third embodiment of the geometric phase in-line scanning holography system according to the present disclosure.

FIG. 15 is a diagram illustrating a third embodiment of a geometric phase in-line scanning holography system according to the present disclosure.

As illustrated in FIG. 15, a geometric phase in-line scanning holography system 3300 according to the third embodiment includes a polarizer 3110, a collimator 3120, a polarization-sensitive lens 3130, scanning unit 3140, a light integrator 3150, first to third beam splitters 3355*a*, 3355*b*, 3355*c*, first to fourth polarizers 3360*a*, 3360*b*, 3360*c*, and 3360*d*, first to fourth photodetectors 3370*a*, 3370*b*, 3370*c*, and 3370*d*, and an electronic processor 3380.

The third embodiment of FIG. 15 has a configuration obtained by changing the light integration portion from the structure of the first embodiment of FIG. 12. Accordingly, in FIG. 15, components having the same reference numerals as in the first embodiment of FIG. 12 perform the same operations, and thus, additional description thereon is omitted. In addition, the configuration of FIG. 15 may be applied to FIGS. 17, 19, and 20 below.

Hereinafter, components subsequent to the light integrator 3150 will be mainly described.

The first beam splitter 3355*a* receives the integrated beam from the light integrator 3150 and splits the integrated beam into first and second output beams. The first output beam passing through the first beam splitter 3355*a* is transferred to the second beam splitter 3355*b*, and the second output beam reflected therefrom is transferred to the third beam splitter 3355*c*.

The second beam splitter 3355*b* splits the first output beam into an $1a^{th}$ output beam and an $1b^{th}$ output beam again. The $1a^{th}$ output beam passing through the second beam splitter 3355*b* is transferred to the first polarizer 3360*a*, and the $1b^{th}$ output beam reflected therefrom is transferred to the second polarizer 3360*b*.

The third beam splitter 3355*c* splits the second output beam into $2a^{th}$ and $2b^{th}$ output beams again. The $2a^{th}$ output beam passing through the third beam splitter 3355*c* is transferred to the third polarizer 3360*c*, and the $2b^{th}$ output beam reflected therefrom is transferred to the fourth polarizer 3360*d*.

In this case, the second, third, and fourth polarizers 3360*b*, 3360*c*, and 3360*d* have polarization directions rotated by 45 degrees, 90 degrees, and 135 degrees clockwise, respectively, based on the polarization direction of the first polarizer 3360*a*.

The first to fourth photodetectors 3370*a*, 3370*b*, 3370*c*, and 3370*d* are installed to correspond to the first to fourth polarizers 3360*a*, 3360*b*, 3360*c*, and 3360*d*, respectively, and detect respective output beams passing through the first to fourth polarizers 3360*a*, 3360*b*, 3360*c*, and 3360*d*.

Here, the first to fourth photodetectors 3370*a*, 3370*b*, 3370*c*, and 3370*d* generate the first to fourth current signals, respectively, in correspondence with intensities of the output beams passing through the first to fourth polarizers 3360*a*, 3360*b*, 3360*c*, and 3360*d*, as in the first embodiment.

The detected first to fourth current signals are referred to as $n^{th}$ current signal ($I_{p_n}(x,y;z)$ and may be defined by following Equation 28.

$$I_{p_n}(x, y, z) = \int O(x_0, y_0; z) \otimes \cos\left[\frac{2\pi f_{gp}}{\lambda(2f_{gp} + z)z}(x_0^2 + y_0^2) + p_n\right]dz, \quad \text{Equation 28}$$

$$p_n = \left\{0, \frac{\pi}{2}, \pi, \frac{3\pi}{2}\right\}$$

Here, n={1, 2, 3, 4}, which are indexes corresponding to the first, second, third, and fourth photodetectors, respectively.

In addition, $p_n$ is a shifted phase of a hologram signal generated by the $n^{th}$ photodetector designated as n, $O(x_0, y_0; z)$ is a three-dimensional distribution for reflectance of an object and is a three-dimensional image of the object, $\otimes$ is a convolution operation, $\lambda$ is a wavelength of a used beam, (x,y) is a scan position of a scan beam designated by the scanning unit 3140, $f_{gp}$ is a focal length of the polarization-sensitive lens, and z is a distance from a focal point of a second spherical wave to the object.

The first to fourth current signals according to Equation 28 are transferred to the AD converter 3382 in the electronic processor 3380.

The electronic processor 3380 processes the first to fourth current signals detected by the first to fourth photodetectors to generate a complex hologram of the object, and includes the AD converter 3382, the signal processor 3383, the storage 3384, and the scan controller 3385.

The AD converter 3382 converts the first to fourth current signals into digital signals. The AD converter 3382 includes four input channels and receives a 0 phase, a π/2 phase, a π phase, and a 3π/2 phase of Equation 28 through each channel and converts the phases into digital signals. The converted digital current signals are provided to the signal processor 3383 together with scan positions of the scanning unit 3140.

The signal processor 3383 generates a complex hologram of the object from the converted digital signals, and the storage 3384 stores the generated complex hologram.

In this case, the complex hologram may be defined by following Equation 29.

$$I_H(x, y) = \{I_{p_3}(x, y) - jI_{p_1}(x, y)\} - j\{I_{p_2}(x, y) - jI_{p_0}(x, y)\} = \quad \text{Equation 29}$$

$$\int O(x_0, y_0; z) \otimes \exp\left[j\frac{2\pi f_{gp}}{\lambda(2f_{gp} + z)z}(x_0^2 + y_0^2)\right]dz$$

Whenever hologram processing for a certain position of the object is completed, the scan controller 3385 generates a control signal for changing positions of the scanning unit 3140 and transfers the generated control signal to the scanning unit 3140. Of course, to this end, the signal processor 3383 forms two-dimensional arrays for each scan position by adding signals according to each phase of Equation 28 by using a complex addition method as represented by Equation 29, and the storage 3384 stores the two-dimensional arrays.

In addition, the signal processor 3383 forms two-dimensional arrays according to each scan position for the signal according to each phase of Equation 28 and transfers the two-dimensional arrays to the storage 3384, and then, reads the two-dimensional arrays from the storage 3384 to add the two-dimensional arrays corresponding to signals according to each phase of Equation 28 by using the complex addition method of Equation 29, and then stores the two-dimensional arrays in the storage 3384 again, when the scan ends.

The following describes a modification example of the third embodiment. The modification example is a case in which the third beam splitter 3355c, the fourth polarizer 3360d, and the fourth photodetector 3370d in the dotted line box are removed from FIG. 15 which is a diagram according to the third embodiment.

In this case, operations of the first and second beam splitters 3355a and 3355b are the same as in the third embodiment. A difference from the third embodiment is that the second output beam reflected from the first beam splitter 3355a is transferred to the third polarizer 3360c to be polarized, and the beam polarized through the third polarizer 3360c is detected by the third detector 3370c.

In the modification example, three current signals outputted from the first, second, and third photodetectors 3370a, 3370b, and 3370c are converted into digital signals by an AD converter having three channels to be transferred to the signal processor, and the signal processor may process the digital signals by using the method of Equation 30 to obtain a complex hologram.

$$I_H(x, y) = I_{p_1}(x, y)\{\exp(jp_3) - \exp(jp_2)\} + I_{p_3}(x, y) \quad \text{Equation 30}$$

$$\{\exp(jp_1) - \exp(jp_2)\} + I_{p_1}(x, y)\{\exp(jp_2) - \exp(jp_1)\} =$$

$$\int O(x_0, y_0; z) \otimes \exp\left[j\frac{2\pi f_{gp}}{\lambda(2f_{gp} + z)z}(x_0^2 + y_0^2)\right]dz$$

According to the present disclosure described above, a complex hologram of a real object without bi-image noise and background noise may be obtained by using a geometric structure according to polarization without using a complicated modulator for modulating an optical signal, and thus, it is possible to reduce complexity of a structure and to miniaturize and lighten and to apply to mobile devices sensitive to energy consumption.

Figure 16:
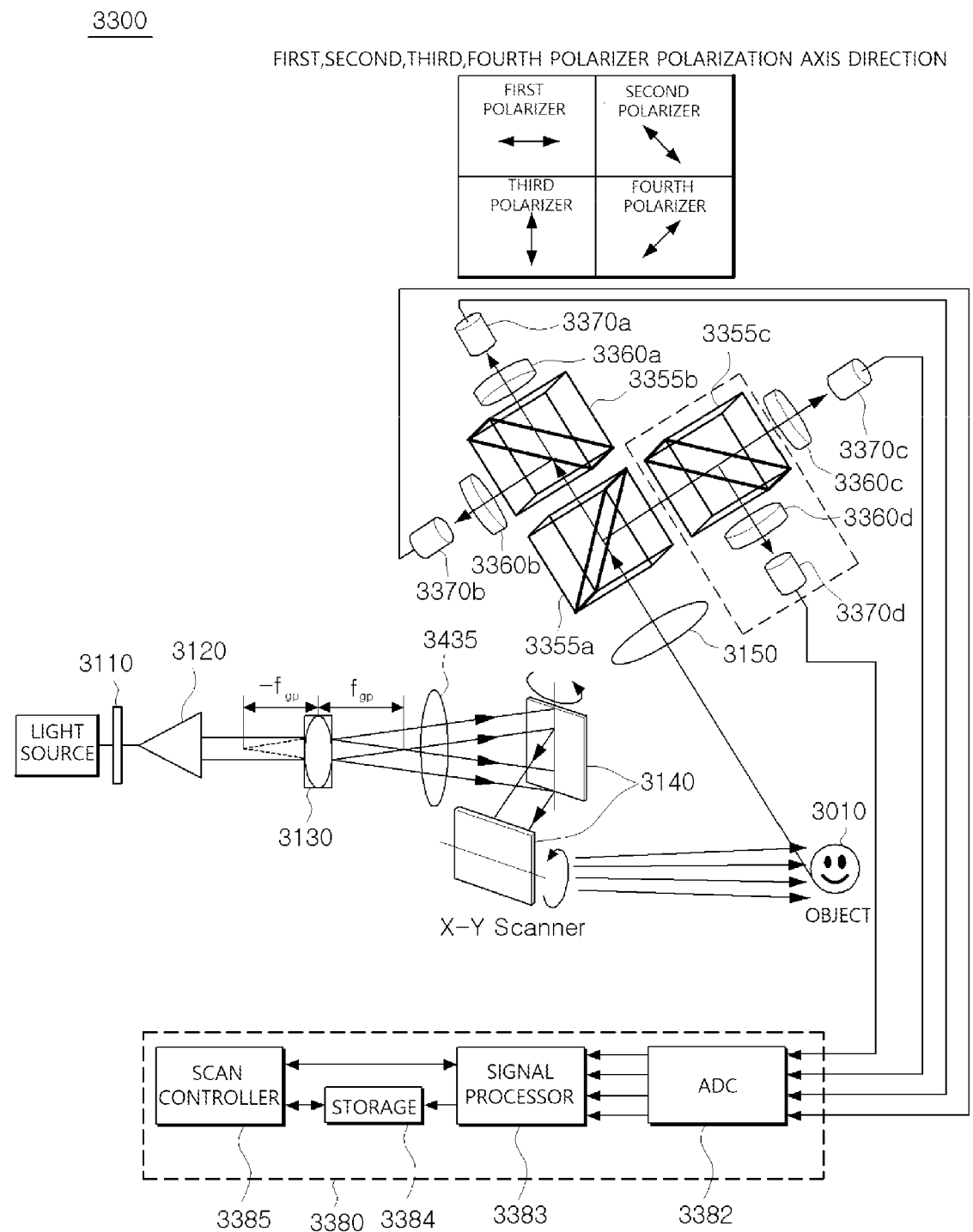
FIG. 16 is a diagram illustrating a fourth embodiment of the geometric phase in-line scanning holography system according to the present disclosure.

FIG. 16 is a diagram illustrating a fourth embodiment of the geometric phase in-line scanning holography system according to the present disclosure.

FIG. 16 illustrates that a lens 3435 is additionally inserted between the polarization-sensitive lens 3130 and the scanning unit 3140 in the structure of the third embodiment of FIG. 15, and a principle thereof is the same as the principle of FIG. 14, and thus, additional description on the same components is omitted. In this way, when the lens 3435 is additionally inserted, the same effects as in Equation 25 to Equation 27 may be obtained.

Hereinafter, the present embodiment provides a method of obtaining a hologram more robust against a phase fluctuation by offsetting the phase fluctuation generated at scan positions of scan beams designated by the scanning unit 3140 according to a vibration of the geometric phase in-line scanning holography system, a fluctuation of a light source, an optical alignment error, and so on.

Figure 17:
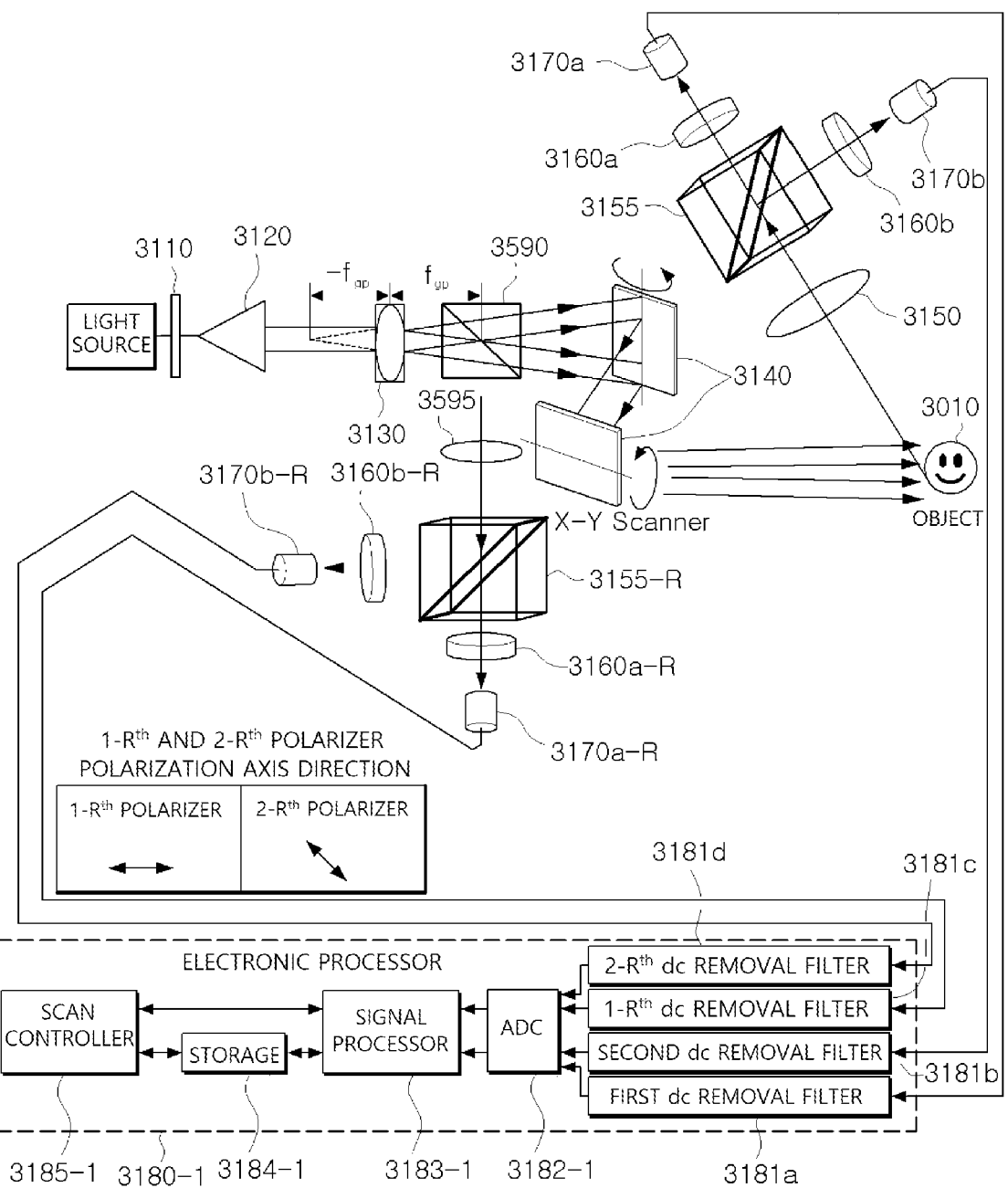
FIG. 17 is a diagram illustrating a fifth embodiment of the geometric phase in-line scanning holography system according to the present disclosure.

FIG. 17 is a diagram illustrating a fifth embodiment of the geometric phase in-line scanning holography system according to the present disclosure. FIG. 17 illustrates that a phase fluctuation compensation function is added to the structure according to the first embodiment of FIG. 12.

As illustrated in FIG. 17, a geometric phase in-line scanning holography system 3500 according to the fifth embodiment includes a polarizer 3110, a collimator 3120, a polarization-sensitive lens 3130, scanning unit 3140, a first light integrator 3150, a first beam splitter 3155, first and second polarizers 3160a and 3160b, first and second photodetectors 3170a and 3170b, an electronic processor 3180-1, a second beam splitter 3590, a second light integrator 3595, and an R-light integrator ("R" notation element).

FIG. 17 illustrates that the second beam splitter 3590, the second light integrator 3595, and the R-light integrator ("R" notation element) are additionally inserted in the structure of the first embodiment of FIG. 12 so as to correct a phase fluctuation due to a vibration of the system 3500. Additional description on the remaining components of the same reference numerals is omitted.

First, when compared with FIG. 12, it can be seen that the second beam splitter 3590 is additionally arranged between the polarization-sensitive lens 3130 and the scanning unit 3140 in FIG. 17.

The second beam splitter 3590 transmits therethrough some interference beams generated by the polarization-sensitive lens 3130 to be used for scanning an object and reflects some of the interference beams to be transferred to the R-light integrator.

That is, the second beam splitter 3590 transmits therethrough some of the interference beams incident on one side thereof to transfer to the scanning unit 3140 on the other side and reflects some of the interference beams to transfer to the second light integrator 3595 on a lower side thereof. In this case, the second light integrator 3595 spatially integrates the interference beams reflected from the second beam splitter 3590. The second light integrator 3595 may be configured by the same component as the first light integrator 3150.

The beam integrated by the second light integrator 3595 is transferred to the R-light integrator. The R-light integrator processes the beam reflected by the second beam splitter 3590. Here, components 3155-R, 3160a-R, 3160b-R, 3170a-R and 3170b-R of R-light integrator are arranged symmetrically to components 3155, 3160a, 3160b, 3170a, and 3170b located at a rear stage of the first light integrator 3150.

Specifically, the R-light integrator includes an 1-R$^{th}$ beam splitter 3155-R, 1-R$^{th}$ and 2-R$^{th}$ polarizers 3160a-R and 3160b-R, and 1-R$^{th}$ and 2-R$^{th}$ photodetectors 3170a-R and 3170b-R which are arranged symmetrically to the first beam splitter 3155, the first and second polarizers 3160a and 3160b, and the first and second photodetectors 3170a and 3170b, respectively, located at a rear stage of the first light integrator 3150.

Since a principle of separation, polarization, and detection of a beam performed by internal elements of the R-light integrator is the same as the principle described above, detailed description thereon is omitted. In this way, the beam detected by the 1-R$^{th}$ and 2-R$^{th}$ photodetectors 3170a-R and 3170b-R which are the last paths of the R-light integrator are transferred to the electronic processor 3180-1.

The electronic processor 3180-1 uses 1-R$^{th}$ and 2-R$^{th}$ current signals detected by the 1-R$^{th}$ and 2-R$^{th}$ photodetectors 3170a-R and 3170b-R as first and second phase correction reference signals to compensate for the phase fluctuation due to the vibration of the system 3500.

In addition, when compared with FIG. 12, the electronic processor 3180-1 of FIG. 17 further includes 1-R$^{th}$ and 2-R$^{th}$ dc removal filters 3181c and 3181d together with the first and second dc removal filters 3181a and 3181b.

That is, in the same manner that the first embodiment of FIG. 12 removes dc components of the first and second current signals detected by integrating beams reflected from an object by using the first and second dc removal filters 3181a and 3181b before signal processing, the fifth embodiment of FIG. 17 further includes a process of removing dc components from the 1-R$^{th}$ and 2-R$^{th}$ current signals (hereinafter, referred to as first and second phase correction reference signals) detected by integrating interference beams at a front stage of the scanning unit 3140 by using the 1-R$^{th}$ and 2-R$^{th}$ dc removal filters 3181c and 3181d.

The 1-R$^{th}$ and 2-R$^{th}$ current signals from which dc components are removed may be represented by following Equation 31 and Equation 32.

$$I_0^{Ph-Flu}(x, y) = \cos[\delta(x, y)] \quad \text{Equation 31}$$

$$I_{\pi/2}^{Ph-Flu}(x, y) = \cos\left[\delta(x, y) + \frac{\pi}{2}\right] \quad \text{Equation 32}$$

Here, δ(x,y) is a phase fluctuation at a scan position of a scan beam designated by the scanning unit 3140 according to a system vibration, a light source fluctuation, a light alignment error, and so on (hereinafter, comprehensively referred to as a "system vibration").

Of course, in FIG. 17, the electronic processor 3180-1 processes the first and second current signals detected by the first and second photodetectors 3170a and 3170b in the same manner as in FIG. 12 to generate a complex hologram of an object, and additionally process the 1-R$^{th}$ and 2-R$^{th}$ current signals detected by the 1-R$^{th}$ and 2-R$^{th}$ photodetectors 3170a-R and 3170b-R to generate a complex hologram for phase correction. In addition, a phase fluctuation due to the system vibration is corrected by reflecting the complex hologram for phase correction in the complex hologram of the object.

To this end, the AD converter 3182-1 converts the first and second phase correction reference signals from which dc components are removed into digital signals. The signal processor 3183-1 generates the complex hologram for phase correction from the converted digital signals, and then corrects the phase fluctuation of the system 3500 by multiplying a complex conjugate of the complex hologram for phase correction by the complex hologram of an object stored in the storage 3184-1.

More specifically, the AD converter 3182-1 receives the in-phase signal of Equation 31 and the π/2 phase signal of Equation 32 through each channel and converts the phase signals into digital signals. The signal processor 3183-1 generates a complex hologram for phase correction from the converted digital signals and stores complex hologram in the storage unit 3184-1.

In this case, the complex hologram for phase correction may be defined by following Equation 33.

$$I^{Ph-Flu}(x, y) = I_0^{Ph-Flu}(x, y) - jI_{\pi/2}^{Ph-Flu}(x, y) = \exp[-j\delta(x, y)] \quad \text{Equation 33}$$

The scan controller 3185-1 generates a control signal for changing positions of the scanning unit 3140 whenever hologram processing for a certain position of an object is completed, and transfers the generated control signal to the scanning unit 3140. Of course, to this end, the signal processor 3183-1 forms two-dimensional arrays for each scan position by adding Equation 31 and Equation 32 to each other by using a complex addition method as in Equation 33, and the storage 3184-1 stores the two-dimensional arrays.

Of course, in this case, too, the AD converter 3182-1 may also receive outputs of the 1-R$^{th}$ and 2-R$^{th}$ photodetectors 3170a-R and 3170b-R and convert the outputs into digital signals, and then perform dc removal filtering by using a digital signal processing method.

In addition to this, the signal processor 3183-1 forms two-dimensional arrays according to each scan position for Equation 31 and Equation 32 and transfers the two-dimensional arrays to a storage, and then reads the two-dimensional arrays from the storage when the scan ends and adds the two-dimensional arrays corresponding to Equation 31 and Equation 32 to each other by using the complex addition method of Equation 33 and then store the two-dimensional arrays in the storage again.

Meanwhile, since the hologram of the object stored in the storage includes the phase fluctuation components at the scan positions designated by the scanning unit, the signal processor 3183-1 corrects the phase fluctuation by multiplying the complex conjugate of the phase fluctuation obtained by Equation 33 by the hologram of the object stored in the storage.

Figure 18:
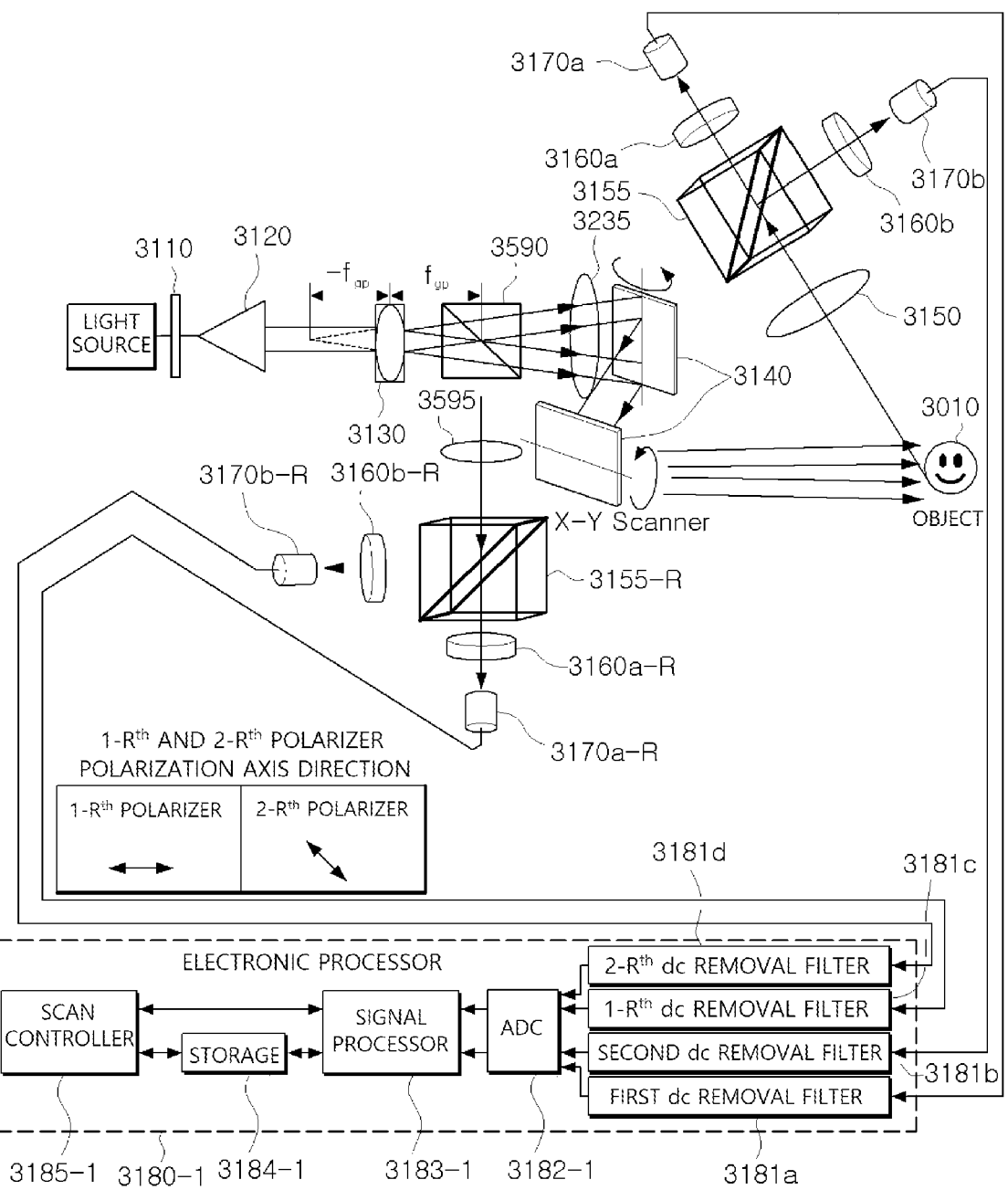
FIG. 18 is a diagram illustrating a modification example of FIG. 17.

FIG. 18 is a diagram illustrating a modification example of FIG. 17. FIG. 18 illustrated that a lens 3235 is further added to the structure of FIG. 17, and since an effect of the lens is described with reference to FIG. 14, redundant description thereon is omitted.

Figure 19:
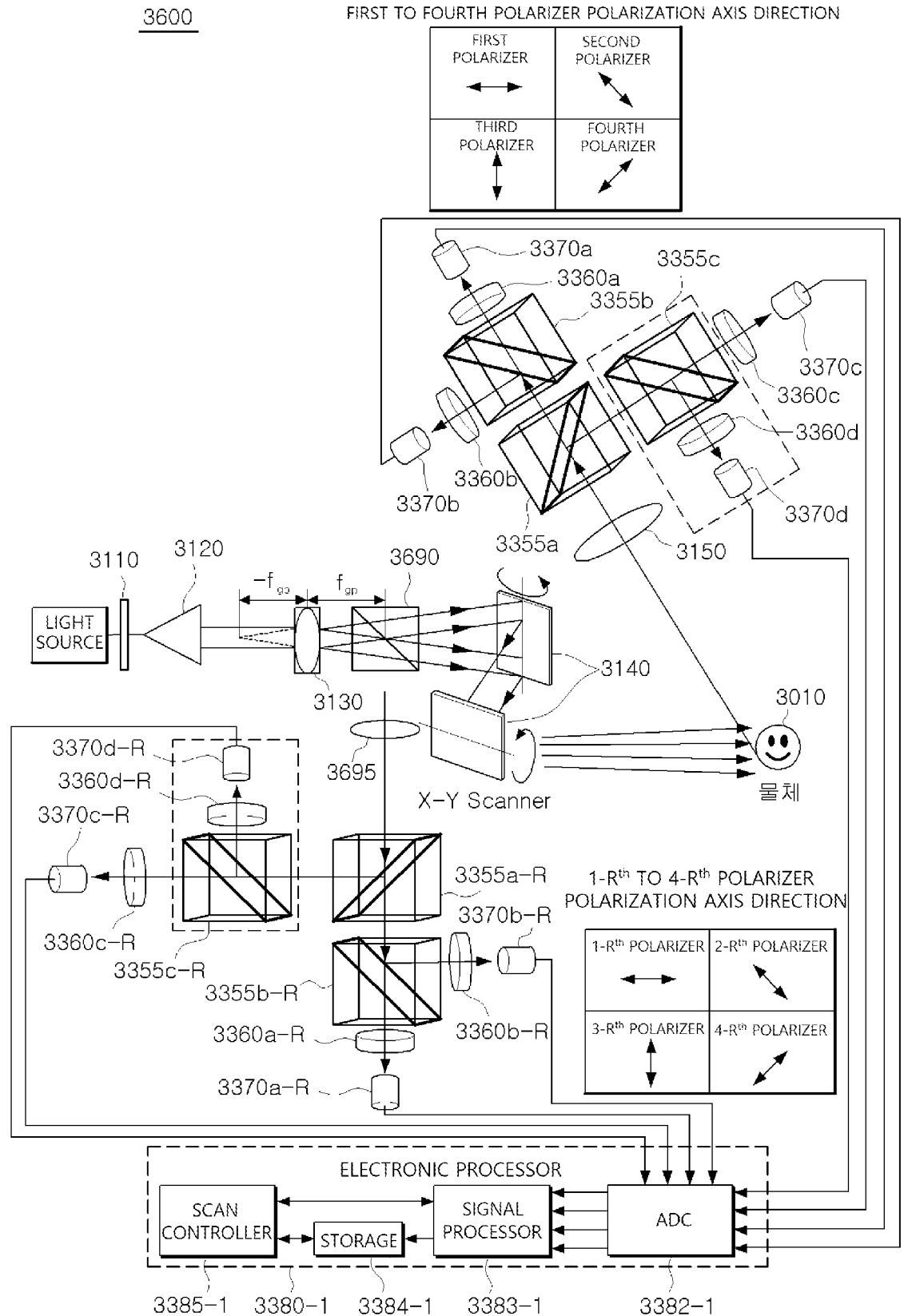
FIG. 19 is a diagram illustrating a sixth embodiment of the geometric phase in-line scanning holography system according to the present disclosure.

FIG. 19 is a diagram illustrating a sixth embodiment of the geometric phase in-line scanning holography system according to the present disclosure. FIG. 19 illustrates that a phase fluctuation compensation function is added to the structure of the third embodiment of FIG. 15.

As illustrated in FIG. 19, a geometric phase in-line scanning holography system 3600 according to the sixth embodiment includes a polarizer 3110, a collimator 3120, a polarization-sensitive lens 3130, scanning unit 3140, a first light integrator. 3150, first to third beam splitters 3355a, 3355b, and 3355c, first to fourth polarizers 3360a, 3360b, 3360c, and 3360d, first to fourth photodetectors 3370a, 3370b, 3370c, and 3370d, an electronic processor 3380-1, a fourth beam splitter 3690, a second light integrator 3695, and an R-light integrator ("R" notation element).

FIG. 19 illustrates that the fourth beam splitter 3690, the second light integrator 3695, and the R-light integrator ("R" notation element) are additionally inserted into the structure of the third embodiment of FIG. 15 so as to correct a phase fluctuation due to a vibration of the system 3600. Additional description on the remaining components of the same reference numerals is omitted.

First, when compared with FIG. 15, it can be seen that the fourth beam splitter 3690 is additionally arranged between the polarization-sensitive lens 3130 and the scanning unit 3140 in FIG. 19. The fourth beam splitter 3690 transmits therethrough some of interference beams generated by the polarization-sensitive lens 3130 to be used for scanning an object, and reflects some of the interference beams to be transferred to the R-light integrator.

That is, the fourth beam splitter 3690 transmits therethrough some of interference beams incident on one side thereof to be transferred to the scanning unit 3140 on the other side and reflects some of the interference beams to be transferred to the second light integrator 3695 on the lower side. In this case, the second light integrator 3895 may spatially integrate the interference beams reflected from the second beam splitter 3690 and may be configured with the same element as the first light integrator 3150.

The beam integrated by the second light integrator 3695 is transferred to the R-light integrator. The R-light integrator processes the reflected beam from the fourth beam splitter 3690. In FIG. 19, components 3355a-R, 3355b-R, 3355c-R, 3360a-R, 3360b-R, 3360c-R, 3360d-R, 3370a-R, 3370b-R, 3370c-R, and 3370d-R of R-light integrator are arranged symmetrically to components 3355a, 3355b, 3355c, 3360a, 3360b, 3360c, 3360d, 3370a, 3370b, 3370c, and 3370d located at a rear stage of the first light integrator 3150.

Specifically, the R-light integrator includes 1-$R^{th}$ to 3-$R^{th}$ beam splitters 3355a-R, 3355b-R, and 3355c-R, 1-$R^{th}$ to 4-$R^{th}$ polarizers 3360a-R, 3360b-R, 3360c-R, and 3360d-R, and 1-$R^{th}$ to 4-$R^{th}$ photodetectors 3370a-R, 3370b-R, 3370c-R, and 3370d-R which are arranged symmetrically to first to third beam splitters 3355a to 3355c, first to fourth polarizers 3360a to 3360d, and first to fourth photodetectors 3370a to 3370d located at a rear stage of the first light integrator 3150.

Since a principle of separation, polarization, and detection of a beam performed by internal elements of the R-light integrator is the same as the principle described above, detailed description thereon is omitted. In this way, the beam detected by the 1-$R^{th}$ to 4-$R^{th}$ photodetectors 3370a-R, 3370b-R, 3370c-R, and 3370d-R which are the last paths of the R-light integrator are transferred to the electronic processor 3380-1.

The electronic processor 3380-1 uses 1-$R^{th}$ to 4-$R^{th}$ current signals detected by the 1-$R^{th}$ to 4-$R^{th}$ photodetectors 3370a-R, 3370b-R, 3370c-R, and 3370d-R as first to fourth phase correction reference signals to compensate for the phase fluctuation due to the vibration of the system 3600.

In the configuration of FIG. 15 described above, dc removal may be made without a dc removal filter, FIG. 19 also does not require an additional dc removal filter.

The 1-$R^{th}$ to 4-$R^{th}$ current signals may be represented by following Equation 34 and Equation 35.

$$I_{p_n}^{Ph-Flu}(x, y) = \cos[\delta(x, y) + p_n], \, p_n = \left\{0, \frac{\pi}{2}, \pi, \frac{3\pi}{2}\right\} \quad \text{Equation 34}$$

$$I^{Ph-Flu}(x, y) = \quad \text{Equation 35}$$
$$\{I_{p_3}(x, y) - jI_{p_1}(x, y)\} - j\{I_{p_2}(x, y) - jI_{p_0}(x, y)\} =$$
$$\exp[-j\delta(x, y)]$$

Here, $\delta(x,y)$ is a phase fluctuation component.

Of course, in FIG. 19, the electronic processor 3380-1 processes the first to fourth current signals detected by the first to fourth photodetectors 3370a to 3370d in the same manner as in FIG. 15 to generate a complex hologram of an object, and additionally process the 1-$R^{th}$ to 4-$R^{th}$ current signals detected by the 1-$R^{th}$ to 4-$R^{th}$ photodetectors 3370a-R and 3370d-R to generate a complex hologram for phase correction.

In addition, a phase fluctuation due to the system vibration is corrected by reflecting the complex hologram for phase correction in the complex hologram of the object. The complex hologram for phase correction may be defined by following Equation 36.

$$I_H(x, y) = I_{p_1}(x, y)\{\exp(jp_3) - \exp(jp_2)\} + \quad \text{Equation 36}$$
$$I_{p_2}(x, y)\{\exp(jp_1) - \exp(jp_2)\} +$$
$$I_{p_1}(x, y)\{\exp(jp_2) - \exp(jp_1)\} = \exp[-j\delta(x, y)]$$

Figure 20:
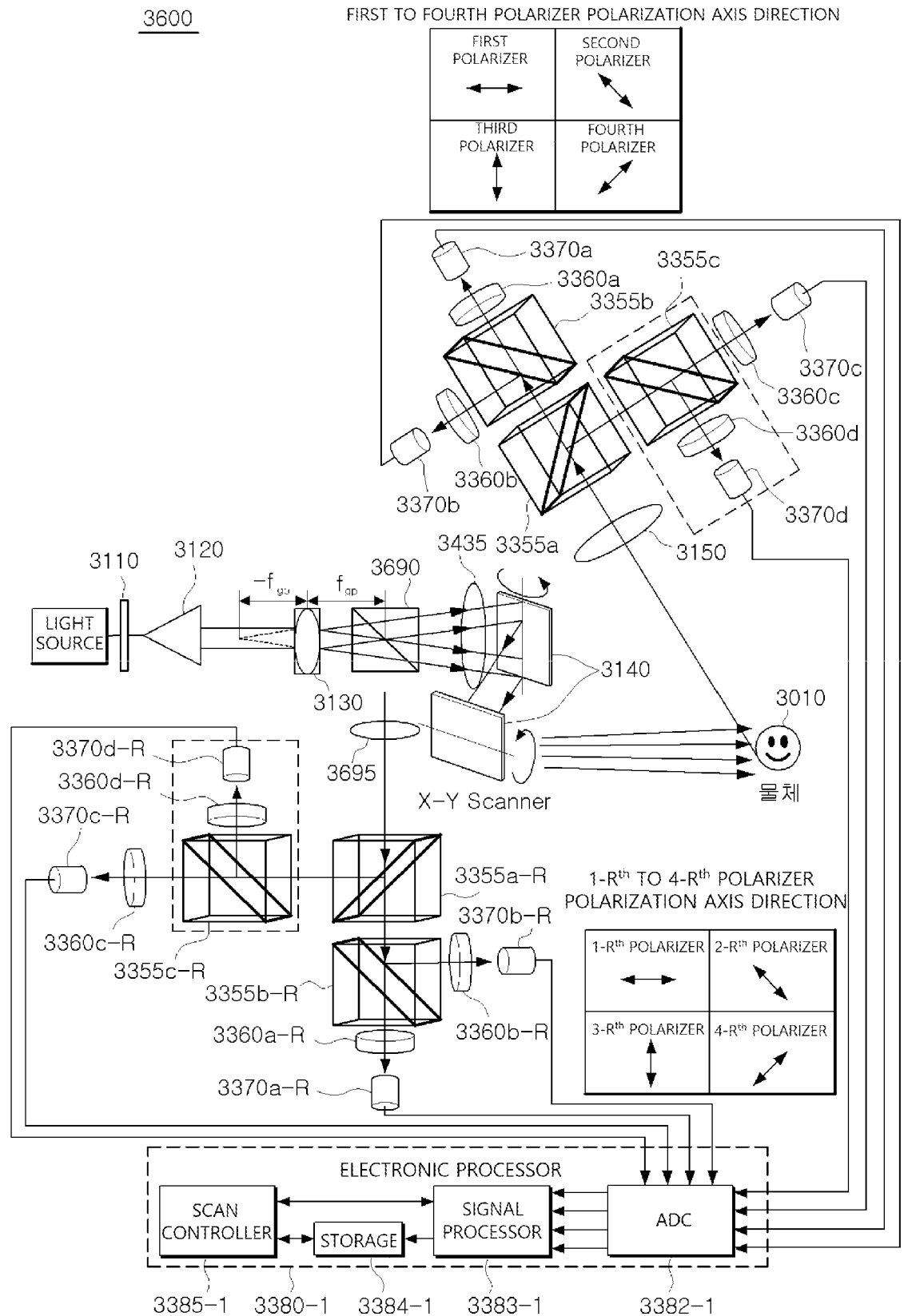
FIG. 20 is a diagram illustrating a modification example of FIG. 19.

FIG. 20 is a diagram illustrating a modification example of FIG. 19. FIG. 20 illustrates that a lens 3435 is further added to the configuration of FIG. 19, and since an effect of the lens is previously described, redundant description thereon is omitted.

As described above, although the first to sixth embodiments of the present disclosure are described as integrating beams reflected from an object, when the object is a fluorescent substance, a light integrator may integrate fluorescent beams from the object and transfer the integrated beams to each photodetector, and each photodetector may detect the spatially integrated beam through the light integrator and record a hologram of the fluorescent substance. In this case, an optical filter including a dichroic mirror that filters light corresponding to a wavelength of fluorescent beam from the object and transfers the filtered light to the photodetector is placed between the photodetectors and the object, and thus, optical noise may be reduced.

In addition, when the object is a light-transmissive object that transmits light therethrough, a light integrator and each photodetector are placed in a path of light passing through the object, and the light integrator integrates the light passing through the object and transmits the light to each photodetector, and each photodetector may detect a spatially integrated beam through the light integrator and records a hologram of the light-transmissive object.

In addition, in the first to sixth embodiments, a Fourier lens and a spatial filter composed of pin-holes located at a focal point of the Fourier lens are located between each photodetector and the object, and a hologram including a phase distribution of the object may be obtained by spatially filtering the light reflected from or passing through the object.

According to the present disclosure described above, a scan pattern is formed in a single optical path by using a polarization-sensitive lens, and thus, an optical scanning holography with high efficiency and high quality may be provided, and also there is an advantage of being robust and stable against external environment by using an optical system structure with high stability and low complexity.

The present disclosure is described with reference to the embodiments illustrated in the drawings, and the embodiments are merely examples, and those skilled in the art will understand that various modifications and equivalent other embodiments may be derived therefrom. Therefore, the true technical protection scope of the present disclosure should be determined by the technical idea of the appended claims.

What is claimed is:

1. A geometric phase in-line scanning holography system, comprising:
a polarizer configured to convert an input beam into a linearly polarized beam;
a collimator configured to receive the linearly polarized beam from the polarizer and expand the linearly polarized beam;
a single polarization-sensitive lens configured to simultaneously generate, from the expanded linearly polarized beam, a first spherical wave of right-handed circular polarization having a negative focal length located on a source side of the single polarization-sensitive lens, and a second spherical wave of left-handed circular polarization having a positive focal length located on an object side of the single polarization-sensitive lens;
wherein the negative focal length and the positive focal length are formed along a single optical path;
a scanning unit configured to scan an object by using an interference beam formed by superposition of the first spherical wave and the second spherical wave along the single optical path;
a light integrator configured to spatially integrate light reflected from the object scanned by the interference beam;
a first beam splitter configured to receive the spatially integrated light from the light integrator and to split the spatially integrated light into a first output beam and a second output beam;
a second beam splitter configured to split the first output beam into a $1a^{th}$ output beam and a $1b^{th}$ output beam;
a third beam splitter configured to split the second output beam into a $2a^{th}$ output beam and a $2b^{th}$ output beam;
first, second, third, and fourth polarizers respectively arranged to polarize the $1a^{th}$, $1b^{th}$, $2a^{th}$, and $2b^{th}$ output beams, wherein polarization directions of the first to fourth polarizers are rotated 0°, 45°, 90°, and 135°, respectively, relative to one another; and
first, second, third, and fourth photodetectors configured to respectively detect the $1a^{th}$, $1b^{th}$, $2a^{th}$, and $2b^{th}$ output beams passing through the first to fourth polarizers and generate corresponding detection signals,
wherein an electronic processor is configured to combine the detection signals to obtain a complex hologram of the object based on geometric-phase interference of the first spherical wave and the second spherical wave.

2. The geometric phase in-line scanning holography system of claim 1, wherein the single polarization-sensitive lens is a geometric phase lens.

3. The geometric phase in-line scanning holography system of claim 1, wherein the interference beam has a form of a geometric phase Fresnel zone plate and is defined by a following equation, $$I_{GP-FZP}(x_0, y_0; z) = \cos\left[\frac{2\pi f_{gp}}{\lambda(2f_{gp}+z)z}(x_0^2+y_0^2)+2\theta\right]$$

where $\lambda$ is a wavelength of a used beam, $f_{gp}$ is a focal length of the single polarization-sensitive lens, $(x_0^2+y_0^2)$ is a Catharsian coordinate system having a plane orthogonal to an optical axis of the linearly polarized beam as $(x_0,y_0)$, z is a distance from a focal point of the second spherical wave to the object, and $\theta$ is an angle linearly polarized clockwise with respect to a polarization axis of a light source side polarizer that generates and provides the linearly polarized beam from a light source.

4. The geometric phase in-line scanning holography system of claim 1, wherein the electronic processor is configured to generate the complex hologram of the object by processing a first current signal and a second current signal detected by the first photodetector and the second photodetector respectively,
wherein the first photodetector and the second photodetector generate the first current signal $$I_0^{dc}(x,y;z)$$

and the second current signal $$I_{\pi/2}^{dc}(x,y;z)$$

respectively, as represented by following equations in correspondence with intensities of the first output beam and the second output beam passing through the first polarizer and the second polarizer respectively, $$I_0^{dt}(x,y) = \int O(x_0,y_0;z) \otimes \left\{\cos\left[\frac{2\pi f_{gp}}{\lambda(2f_{gp}+z)z}(x_0^2+y_0^2)\right]+dc\right\}dz$$

$$I_{\pi/2}^{dc}(x,y) = \int O(x_0,y_0;z) \otimes \left\{\cos\left[\frac{2\pi f_{gp}}{\lambda(2f_{gp}+z)z}+\frac{\pi}{2}\right]+dc\right\}dz$$

where $O(x_0,y_0;z)$ is a three-dimensional distribution of the reflectance of the object and is a three-dimensional image of the object, $\otimes$ is a convolution operation, $\lambda$ is a wavelength of a used beam, $(x,y)$ is a scan position of a scan beam designated by the scanning unit, $f_{gp}$ is a focal length of the single polarization-sensitive lens, z is a distance from a focal point of the second spherical wave to the object, and dc is a DC bias component.

* * * * *